US012461466B2

(12) United States Patent
Okugawa

(10) Patent No.: US 12,461,466 B2
(45) Date of Patent: Nov. 4, 2025

(54) IMAGE FORMING APPARATUS THAT STORES A CUMULATIVE IMAGE FORMATION AMOUNT

(71) Applicant: CANON KABUSHIKI KAISHA, Tokyo (JP)

(72) Inventor: Hirokazu Okugawa, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/755,925

(22) Filed: Jun. 27, 2024

(65) Prior Publication Data

US 2025/0013164 A1 Jan. 9, 2025

(30) Foreign Application Priority Data

Jul. 4, 2023 (JP) ................................ 2023-110258

(51) Int. Cl.

| | |
|---|---|
| ***G03G 15/00*** | (2006.01) |
| ***B42C 9/00*** | (2006.01) |
| ***G03G 15/043*** | (2006.01) |
| *B42C 1/12* | (2006.01) |

(52) U.S. Cl.

CPC ......... *G03G 15/043* (2013.01); *B42C 9/0081* (2013.01); *G03G 15/50* (2013.01); *G03G 15/6541* (2013.01); *G03G 15/6585* (2013.01); *B42C 1/12* (2013.01); *G03G 2215/00835* (2013.01); *G03G 2215/00936* (2013.01)

(58) Field of Classification Search

CPC .... G03G 15/043; G03G 15/50; G03G 15/553; G03G 15/6541; G03G 15/6585; G03G 2215/00835; G03G 2215/00936; B42C 1/12; B42C 9/0081

See application file for complete search history.

(56) References Cited

U.S. PATENT DOCUMENTS

| | | | | |
|---|---|---|---|---|
| 6,850,714 | B2 * | 2/2005 | Sakurai | G03G 21/1889 399/25 |
| 7,433,615 | B2 * | 10/2008 | Murakami | G03G 15/556 399/49 |
| 2019/0011849 | A1 * | 1/2019 | Funatani | G03G 15/5037 |

FOREIGN PATENT DOCUMENTS

| | | |
|---|---|---|
| JP | H09120245 A | 5/1997 |

* cited by examiner

*Primary Examiner* — Hoang X Ngo
(74) *Attorney, Agent, or Firm* — ROSSI, KIMMS & McDOWELL LLP

(57) ABSTRACT

An image forming apparatus comprises a rotationally driven photosensitive body, a charging device that charges a surface of the photosensitive body, an exposure light source that forms an electrostatic latent image by exposing the surface of the photosensitive body to light, a developing device that forms a toner image by developing the electrostatic latent image using toner, a transfer member that transfers the toner image to a sheet, a first memory that stores a cumulative image formation amount for each one of N exposure regions, and a control circuit that controls the exposure light source.

17 Claims, 19 Drawing Sheets

FIG. 9A

| MAIN SCAN DIRECTION | −100 | −99 | ... | −1 | 0 | 1 | ... | 99 | 100 |
|---|---|---|---|---|---|---|---|---|---|
| NUMBER | $E_{-100}$ | $E_{-99}$ | ... | $E_{-1}$ | $E_0$ | $E_1$ | ... | $E_{99}$ | $E_{100}$ |

FIG. 9B

| | | MAIN SCAN DIRECTION | | | | | | | | |
|---|---|---|---|---|---|---|---|---|---|---|
| | | −100 | −99 | ... | −1 | 0 | 1 | ... | 99 | 100 |
| SUB-SCAN DIRECTION | −38 | $E_{-100,-38}$ | $E_{-99,-38}$ | ... | $E_{-1,-38}$ | $E_{0,-38}$ | $E_{1,-38}$ | ... | $E_{99,-38}$ | $E_{100,-38}$ |
| | −37 | $E_{-100,-37}$ | $E_{-99,-37}$ | ... | $E_{-1,-37}$ | $E_{0,-37}$ | $E_{1,-37}$ | ... | $E_{99,-37}$ | $E_{100,-37}$ |
| | ... | ... | ... | ... | ... | ... | ... | ... | ... | ... |
| | 37 | $E_{-100,37}$ | $E_{-99,37}$ | ... | $E_{-1,37}$ | $E_{0,37}$ | $E_{1,37}$ | ... | $E_{99,37}$ | $E_{100,37}$ |
| | 38 | $E_{-100,38}$ | $E_{-99,38}$ | ... | $E_{-1,38}$ | $E_{0,38}$ | $E_{1,38}$ | ... | $E_{99,38}$ | $E_{100,38}$ |

FIG. 11

| | $E_{-100}$~$E_{-96}$ SOLID BLACK | | $E_{-80}$~$E_{100}$ HT(100) | |
|---|---|---|---|---|
| | DETERMINATION | DENSITY | DETERMINATION | DENSITY |
| COMPARATIVE EXAMPLE I | × | 1.38 | × | 0.69 |
| COMPARATIVE EXAMPLE II | ○ | 1.45 | × | 0.91 |
| PRESENT EMBODIMENT | ○ | 1.44 | ○ | 0.81 |

× : BAD
○ : GOOD

IMAGE FORMING APPARATUS THAT STORES A CUMULATIVE IMAGE FORMATION AMOUNT

BACKGROUND OF THE INVENTION

Field of the Invention

The present invention relates to an image forming apparatus that forms a toner image for bonding together a plurality of sheets.

Description of the Related Art

An electro-photographic image forming apparatus uniformly charges a photosensitive drum, exposes the photosensitive drum to light, forms an electrostatic latent image, and applies toner to the electrostatic latent image to form a toner image. A photosensitive layer provided on a core metal of a photosensitive drum gradually decreases in thickness each time a toner image is formed. As a result, the density of the toner image is gradually reduced. Japanese Patent Laid-Open No. H09-120245 proposes obtaining the thickness of photosensitive layer according to the number of sheets to be supplied to an image forming apparatus and changing an exposure condition according to the thickness.

With this known technique, it is expected that the thickness of photosensitive layer is uniformly reduced at all positions of the surface of the photosensitive body according to the number of sheets where an image is to be printed. However, the amount of reduction in the thickness of photosensitive layer depends on the type of the image being formed. Thus, across the entire surface of the photosensitive body, there may be a disparity in the thickness of photosensitive layer. For example, at a specific position in a main scan direction (a direction parallel with a rotary shaft of the photosensitive body) of the photosensitive body, an adhesive toner image that bonds together a plurality of sheets is often formed. In this case, the thickness of photosensitive layer at the specific position in the main scan direction is reduced more than at other positions.

SUMMARY OF THE INVENTION

The present disclosure provides an image forming apparatus comprising: a rotationally driven photosensitive body; a charging device that charges a surface of the photosensitive body; an exposure light source that forms an electrostatic latent image by exposing the surface of the photosensitive body to light; a developing device that forms a toner image by developing the electrostatic latent image using toner; a transfer member that transfers the toner image to a sheet; a first memory that stores a cumulative image formation amount for each one of N exposure regions of the surface of the photosensitive body; and a control circuit that controls the exposure light source so that an exposure condition is determined on a basis of the cumulative image formation amount for each one of the N exposure regions and each one of the N exposure regions is exposed with light according to the exposure condition.

Further features of the present invention will become apparent from the following description of exemplary embodiments (with reference to the attached drawings).

BRIEF DESCRIPTION OF THE DRAWINGS

FIGS. 9A and 9B are diagrams for explaining memory addresses allocated to exposure regions.

FIG. 11 is a table for explaining experiment results.

DESCRIPTION OF THE EMBODIMENTS

Figure 1:
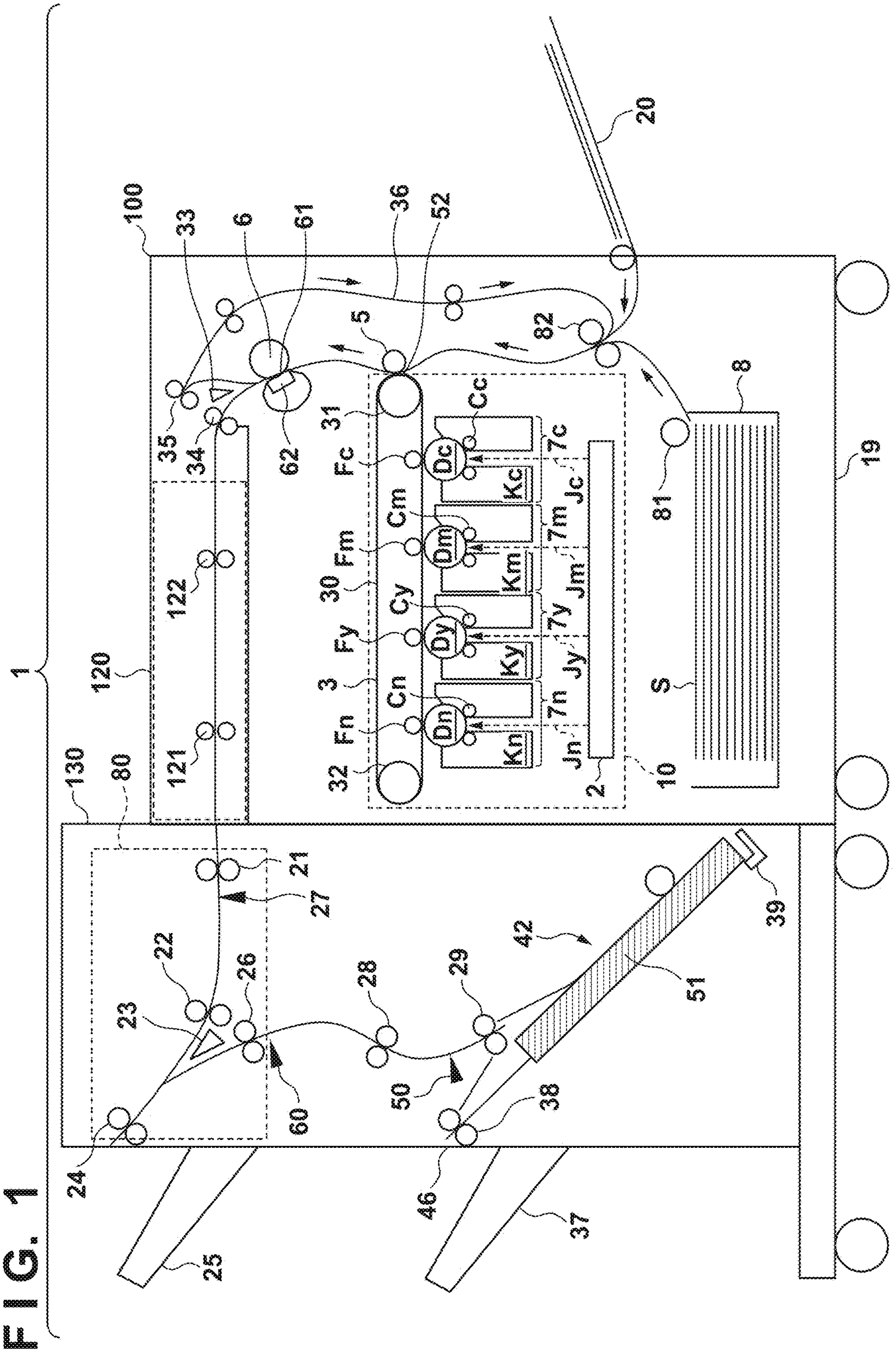
FIG. 1 is a diagram for explaining an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

(1) Image Forming System

As illustrated in FIG. 1, an image forming system 1 includes an image forming apparatus 100 and a post-processing apparatus 130. The post-processing apparatus 130 is a sheet handling apparatus connected to the image forming apparatus 100. The image forming apparatus 100 forms an image on a sheet S, a printing material. An intermediate conveyance unit 120 conveys the sheet S with a formed image to the post-processing apparatus 130. The post-processing apparatus 130 performs post-processing on the sheet S as necessary and outputs the sheet S.

The image forming apparatus 100 includes a sheet cassette 8, an image forming portion 10, a fixing device 6, and a casing 19 that houses these. The image forming portion 10 forms a toner image on the sheet S fed from the sheet cassette 8. The fixing device 6 performs a fixing process to fix the toner image on the sheet S.

The sheet cassette 8 is provided on the lower portion of the image forming apparatus 100. The sheet cassette 8 is inserted into the casing 19 in a removable manner and can house a plurality of the sheets S. In the present example, the maximum size of the sheet S where an image can be formed is assumed to be the A4 size (length 297 mm×width 210 mm). The long side of the A4 sized sheet S is parallel with the conveyance direction of the sheet S. A conveyance roller 81 feeds the sheets S from the sheet cassette 8 and passes the sheets S to a conveyance roller pair 82. The sheets S can also be fed one at a time from a multi-tray 20.

The image forming portion 10 is a tandem electrophotographic unit includes four process cartridges 7*n*, 7*y*, 7*m*, 7*c*, an exposure apparatus 2, and a transfer unit 3. "y", "m", and "c" correspond to yellow, magenta, and cyan, respectively. n refers to the adhesive toner. The characters ymnc indicating the toner colors may be omitted from the reference signs. The color of the adhesive toner may be transparent or black. In a case where the color of the adhesive toner is transparent, black achieved by appropriately mixing yellow, magenta, and cyan (process black). The type (material) of the toner used as the yellow, magenta, and cyan toner and the adhesive toner is thermoplastic resin. Examples of thermoplastic resin include, for example, a polyester resin, a vinyl resin, an acrylic resin, a styrene acrylic resin, and the like. The process cartridges 7*n*, 7*y*, 7*m*, 7*c* include integrally replaceable components involved in the image forming process. In other words, a plurality of components are integrally formed to form the process cartridges 7*n*, 7*y*, 7*m*, 7*c*.

The process cartridges 7*n*, 7*y*, 7*m*, 7*c* each include, respectively, a corresponding developing apparatus Kn, Ky, Km, Kc, photosensitive drum Dn, Dy, Dm, Dc, and charging roller Cn, Cy, Cm, and Cc. Except for the toner type, the process cartridges 7*n*, 7*y*, 7*m*, 7*c* share essentially the same structure.

The developing apparatuses Ky, Km, Kc respectively house yellow, magenta, and cyan toner for forming a visual image on the sheet S. The developing apparatus Kn houses an adhesive toner Tn. The adhesive toner Tn is used in forming a user image (document image) and the thermocompression bonding of a plurality of the sheets S in the post-processing apparatus 130. Note that an image formed by the adhesive toner Tn is formed on a photosensitive drum Dn by developing the adhesive toner Tn.

The image forming portion 10 may include a fifth process cartridge that uses toner for bonding or black toner. Note that depending on the application of the image forming apparatus 100, the type and number of the printing toners can be changed.

The charging rollers Cn, Cy, Cm, and Cc are charging devices that uniformly charge the surface of their corresponding photosensitive drum Dn, Dy, Dm, Dc. The exposure apparatus 2 is disposed below the process cartridges 7*n*, 7*y*, 7*m*, 7*c* and above the sheet cassette 8. The exposure apparatus 2 emits laser beams Jn, Jy, Jm, and Jc at the corresponding photosensitive drums Dn, Dy, Dm, and Dc to form electrostatic latent images. The exposure apparatus 2 may be referred to as an optical scanning apparatus.

The developing apparatuses Kn, Ky, Km, Kc adhere toner to the electrostatic latent images on the photosensitive drums Dn, Dy, Dm, and Dc to form toner images. The developing apparatuses Kn, Ky, Km, Kc may be referred to as developing devices.

The transfer unit 3 includes a transfer belt 30 that functions as an intermediate transfer body (secondary image carrier). The transfer belt 30 is an endless belt installed on an inner roller 31 and a tensioning roller 32. The outer circumferential surface (image forming surface) of the transfer belt 30 faces the photosensitive drums Dn, Dy, Dm, and Dc. Primary transfer rollers Fn, Fy, Fm, and Fc are disposes so that the inner circumferential side of the transfer belt 30 faces the photosensitive drums Dn, Dy, Dm, and Dc.

The primary transfer rollers Fn, Fy, Fm, and Fc transfer the toner images from the corresponding photosensitive drum Dn, Dy, Dm, and Dc to the transfer belt 30. The primary transfer rollers Fn, Fy, Fm, and Fc may be referred to as primary transfer devices. When the transfer belt 30 rotates anticlockwise, the toner images are conveyed to the secondary transfer unit.

A secondary transfer roller 5 is disposed facing the inner roller 31, forming a transfer nip 52 between the secondary transfer roller 5 and the transfer belt 30. The transfer nip 52 transfers the toner images from the transfer belt 30 to the sheet S. The transfer nip 52 may be referred to as a secondary transfer unit.

The fixing device 6 is disposed above (on the downstream side in the conveyance direction of the sheet S) the secondary transfer roller 5. The fixing device 6 applies heat and pressure to the sheet S passing through a fixing nip 61. This fixes the toner image on the sheet S. Note that the fixing device 6 includes a fixing heater 62 for heating the toner image and the sheet S. The fixing heater 62 is a halogen heater or a ceramic heater, for example.

Figure 2A:
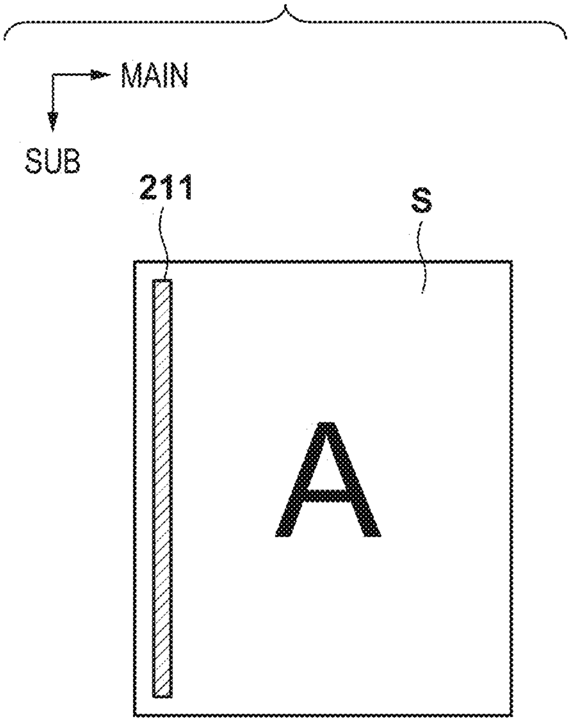
FIGS. 2A and 2B are diagrams for explaining images.

FIG. 2A illustrates a print region 211 of the adhesive toner Tn. The print region 211 extends parallel with the long side of the sheet S. The print region 211 is provided at an end portion near a long side. Accordingly, by layering the plurality of sheets S and applying heat and pressure to the print region 211 of the plurality of sheets S, the post-processing apparatus 130 bonds the plurality of sheets S together and forms a booklet. The booklet in this case is a long edge bound booklet. Here, the width (length in the short side direction) of the adhesive toner image (the print region 211) is 4.0 mm, for example.

Figure 2B:
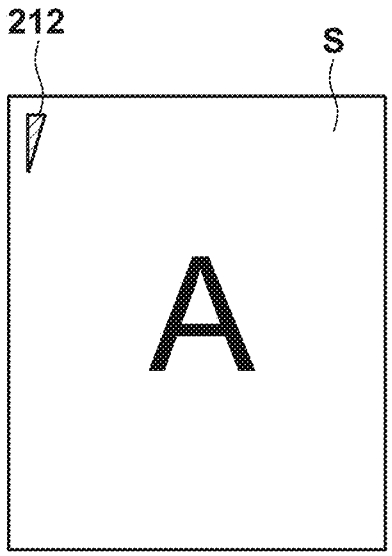

As illustrated in FIG. 2B, near the corners of the sheet S, a small print region 212 for the adhesive toner Tn may be formed. In this case, a corner bound booklet is made. The image from the adhesive toner Tn is not formed on the sheet S corresponding to the cover of the booklet.

The print region 211 of the adhesive toner Tn may be formed on both sides of the sheet S or on only one side of the sheet S. Whether to form the print region 211 of the adhesive toner Tn on only one side or on both sides may be selected taking into account, for example, the adhesive capability of the post-processing apparatus 130, the adhesive capability of the adhesive toner Tn, the type of the sheet S, the function required for the booklet, and the like. A booklet treated as a special edition is required to have reliable adhesiveness. In a case where a thick paper or special sheet S is used as the cover of the booklet, reliable adhesiveness is also required. Thus, in such cases, the print region 211 of the adhesive toner Tn is provided on both sides of the sheet S. In a case where a simple primary-use booklet is formed, the print region 211 of the adhesive toner Tn is formed only on one side of the sheet S.

Now we will return to the description of FIG. 1. As illustrated in FIG. 1, a switch guide 33, which is a flap-like guide member, is provided on the upstream side of the fixing device 6 in the conveyance direction of the sheet S. When one-sided printing mode for forming an image on one side of the sheet S is selected, the switch guide 33 guides the sheet S to discharge rollers 34. When double-sided printing mode for forming an image on both sides of the sheet S is selected, the switch guide 33 guides the sheet S after an image has been formed on the first surface to a switch back roller pair 35. The switch back roller pair 35 conveys the sheet S in a first direction. When the back end of the sheet S is put in a state where it can enter a double-sided conveying path 36, the switch back roller pair 35 starts rotating in reverse. This conveys the sheet S to the double-sided conveying path 36. The double-sided conveying path 36 conveys the sheet S once again to the secondary transfer unit. In this manner, an image is formed on the second surface of the sheet S.

The discharge rollers 34 convey the sheet S to the intermediate conveyance unit 120. The intermediate conveyance unit 120 includes a conveyance roller pair 121, 122. The conveyance roller pair 121, 122 convey the sheet S to the post-processing apparatus 130.

(2) Post-Processing Apparatus

The post-processing apparatus 130 is a floor-standing sheet handling apparatus. The post-processing apparatus 130 has a function for buffering a plurality of sheets, a function for aligning a plurality of sheets, and a function for bonding together a sheet bundle.

Hereinafter, the end portion of the sheet S on the front side in the conveyance direction will be referred to as the front end. The end portion of the sheet S on the back side in the conveyance direction will be referred to as the back end. Of the two end portions of the sheet S, the end which enters the post-processing apparatus 130 before the other is referred to as the first end. Of the two end portions of the sheet S, the end which enters the post-processing apparatus 130 after the other is referred to as the second end. Note that when the post-processing apparatus 130 performs switch back conveying, the front end may change from the first end to the second end, and the back end may change from the second end to the first end.

The sheet S conveyed from the intermediate conveyance unit 120 is passed to an inlet roller 21 of the post-processing apparatus 130. A sheet sensor 27 referred to as an inlet sensor is disposed downstream from the inlet roller 21. When the sheet sensor 27 detects the back end of the sheet S, a conveyance roller pair 22 accelerate the sheet S. When the back end of the sheet S with an upper tray 25 set as the discharge destination arrives between the conveyance roller pair 22 and a conveyance roller pair 24, the conveyance roller pair 22 decelerates. Accordingly, the conveyance speed of the sheet S is made to match a predetermined discharge speed. The conveyance roller pair 22 discharges the sheet S to the upper tray 25.

When the back end of the sheet S with a lower tray 37 set as the discharge destination passes a backflow prevention valve 23, the conveyance roller pair 22 stops conveying the sheet S. Thereafter, the conveyance roller pair 22 starts rotating in reverse. Accordingly, the sheet S is switched back and conveyed to a conveyance roller pair 26. When the front end of the sheet S is detected by a sheet sensor 60 provided downstream from the conveyance roller pair 26, the two rollers forming the conveyance roller pair 24 separate from one another. This allows the subsequent sheet S to be received by the conveyance roller pair 24. Also, with the preceding sheet S held between the conveyance roller pair 26, the conveyance roller pair 26 stop. Coinciding with the arrival of the subsequent sheet S, the conveyance roller pair 26 starts rotating in reverse. Accordingly, the subsequent sheet S is layered on top of the preceding sheet S. By the conveyance roller pair 26 repeatedly performing switch back on the sheets S, the plurality of sheets S are layered, forming a sheet bundle. Such an operation for forming a sheet bundle may be referred to as a buffering operation. The unit that implements the buffering operation may be referred to as a buffering portion 80.

When the sheet bundle is completed at the buffering portion 80, the conveyance roller pair 26 convey the sheet bundle to an intermediate stacker 42. The sheet bundle passes a conveyance roller pair 28 and a sheet sensor 50. Also, the sheet bundle is conveyed to the intermediate stacker 42 by a kick-out roller 29. A movable vertical alignment plate 39 is disposed at the most downstream portion of the intermediate stacker 42 in a standby position. By abutting the sheet bundle against the vertical alignment plate 39, the sheet bundle is aligned.

A plurality of sheet bundles are stacked in order at the intermediate stacker 42. Accordingly, a predetermined number of the sheets S for forming a booklet are stacked at the intermediate stacker 42. When the alignment of the predetermined number of sheets S ends, a thermocompression bonding unit 51 performs a binding operation (thermocompression bonding process) to form a booklet. When the vertical alignment plate 39 moves from the standby position to the discharge position, the booklet is pushed toward discharge rollers 38. When the front end of the booklet is held between the discharge rollers 38, the vertical alignment plate 39 stops and then returns to the standby position. The discharge rollers 38 discharge the booklet received from the vertical alignment plate 39 from a discharge opening 46 to the lower tray 37.

As described above, using the buffering portion 80, the post-processing apparatus 130 forms a sheet bundle made from the plurality of sheets S and conveys the sheet bundle to the intermediate stacker 42. However, one sheet S may be conveyed to the intermediate stacker 42.

(3) Booklet Manufacturing Operation

FIGS. 3A to 3D illustrate a booklet manufacturing operation executed by the intermediate stacker 42. In the initial state, the intermediate stacker 42 is empty. As an example, a sheet bundle W including five sheets S is conveyed from the buffering portion 80 to the intermediate stacker 42.

A Y direction is the direction parallel with the stacking surface (stacking plate) for the sheets S at the intermediate stacker 42 and the direction parallel with the conveyance direction in which the sheets S are conveyed from the kick-out roller 29 to the intermediate stacker 42. The Y direction may be referred to as the vertical direction. An X direction is the direction parallel with the stacking surface of the sheets S at the intermediate stacker 42 and orthogonal to the Y direction. The X direction may be referred to as the horizontal direction. A Z direction is the direction orthogonal to the X direction and the Y direction (normal direction of the stacking surface, thickness direction of the stacked sheets S). The Z direction may be referred to as the height direction. The opposite directions of the X direction, the Y direction, and the Z direction may be referred to as the −X direction, the −Y direction, and the −Z direction, respectively.

The vertical alignment plate 39 and a vertical alignment roller 40 function as a first alignment unit that aligns the sheets S in the first direction (Y direction). The vertical alignment plate 39 is disposed at the most downstream portion of the intermediate stacker 42 in the Y direction. The vertical alignment plate 39 is a reference member (first reference member) corresponding to the reference for the sheet position in the Y direction. The vertical alignment roller 40 is a conveying member that conveys the sheets S in the Y direction to abut the sheets S with the vertical alignment plate 39 and align them. The vertical alignment plate 39 includes a plurality of abutting portions 39*a* to 39*c* disposed at intervals in the X direction. The plurality of abutting portions 39*a* to 39*c* come into contact with the end portions of the sheets S. Note that the vertical alignment plate 39 and the vertical alignment roller 40 are integrally formed as a movable unit 59 that can move in the Y direction. The movable unit 59 can move in the Y direction via a drive source such as a motor. In other words, the position of the vertical alignment plate 39 and the vertical alignment roller 40 can be adjusted in the Y direction. Horizontal alignment joggers 41*a* to 41*c* function as a second alignment unit that aligns sheets in the second direction (X direction) orthogonal to the first direction.

The horizontal alignment joggers 41*a* to 41*c* move in the X direction via a drive source such as a motor and press against the side ends of the sheets S stacked in the intermediate stacker 42. Horizontal alignment plates 72*a* and 72*b* are reference members corresponding to the reference for the position of the sheets S in the X direction. The horizontal alignment plates 72*a* and 72*b* are disposed facing the horizontal alignment joggers 41*a* and 41*b* in the X direction.

(3-1) Preparation Stage

Figure 3A:
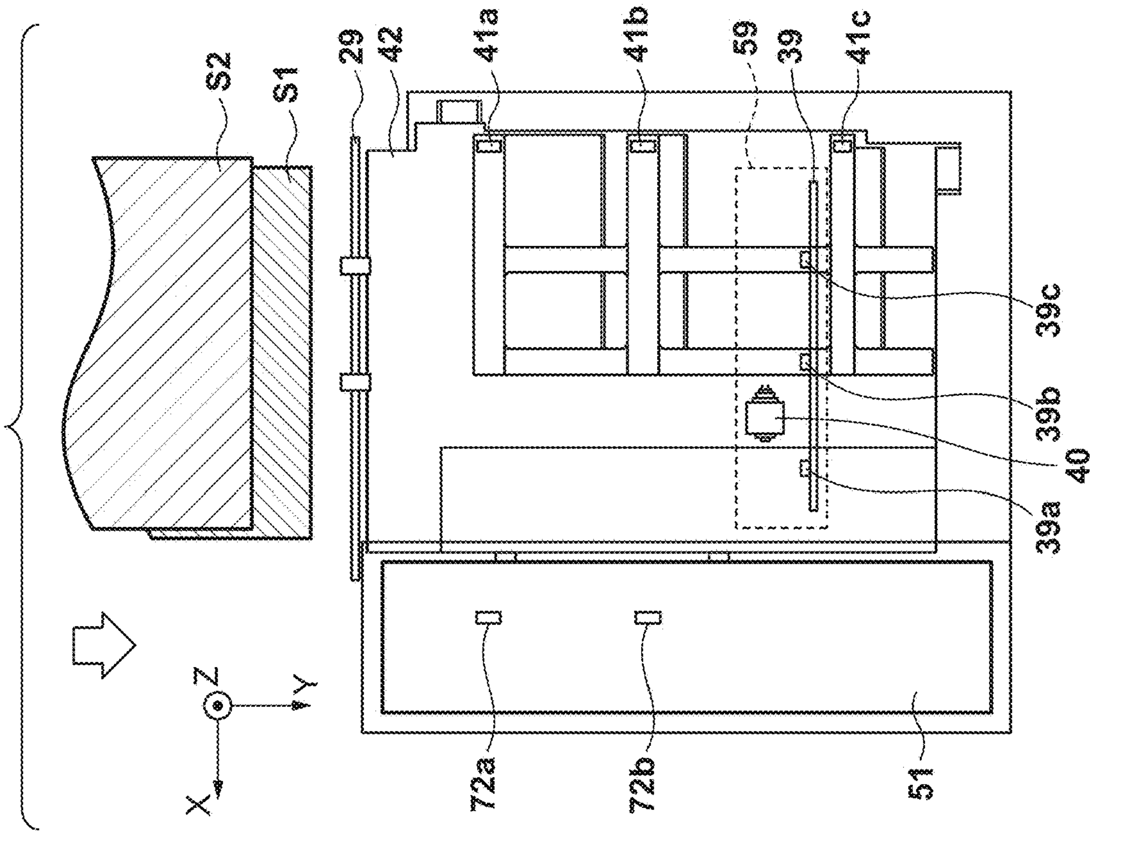
FIGS. 3A to 3D are diagrams for explaining a thermocompression bonding unit.

As illustrated in FIG. 3A, the sheets S1 to S5 are conveyed toward the kick-out roller 29. The sheets S1 to S5 may be conveyed to the intermediate stacker 42 in a state where the sheet S1 located lower down is jutting out in the Y direction past the sheet S1+1 located higher up. Here, i is the index for the sheets S. Before the sheets S are stacked at the intermediate stacker 42, the vertical alignment plate 39 matches the size of the sheets S to be aligned and moves to a predetermined standby position. The standby position is set so that the end portion positions of the sheets S are constant in the −Y direction, irrespective of the size of the sheets S. In other words, the standby position is a position whereby the distance in the Y direction from the nip position of the kick-out roller 29 to the vertical alignment plate 39 is slightly longer than the length of the sheets in the Y direction. The horizontal alignment joggers 41*a* to 41*c* wait at a position separated outward in the X direction from the sheets S being conveyed so as to not interfere with the conveying of the sheets S.

(3-2) Vertical Alignment Stage

Figure 3B:
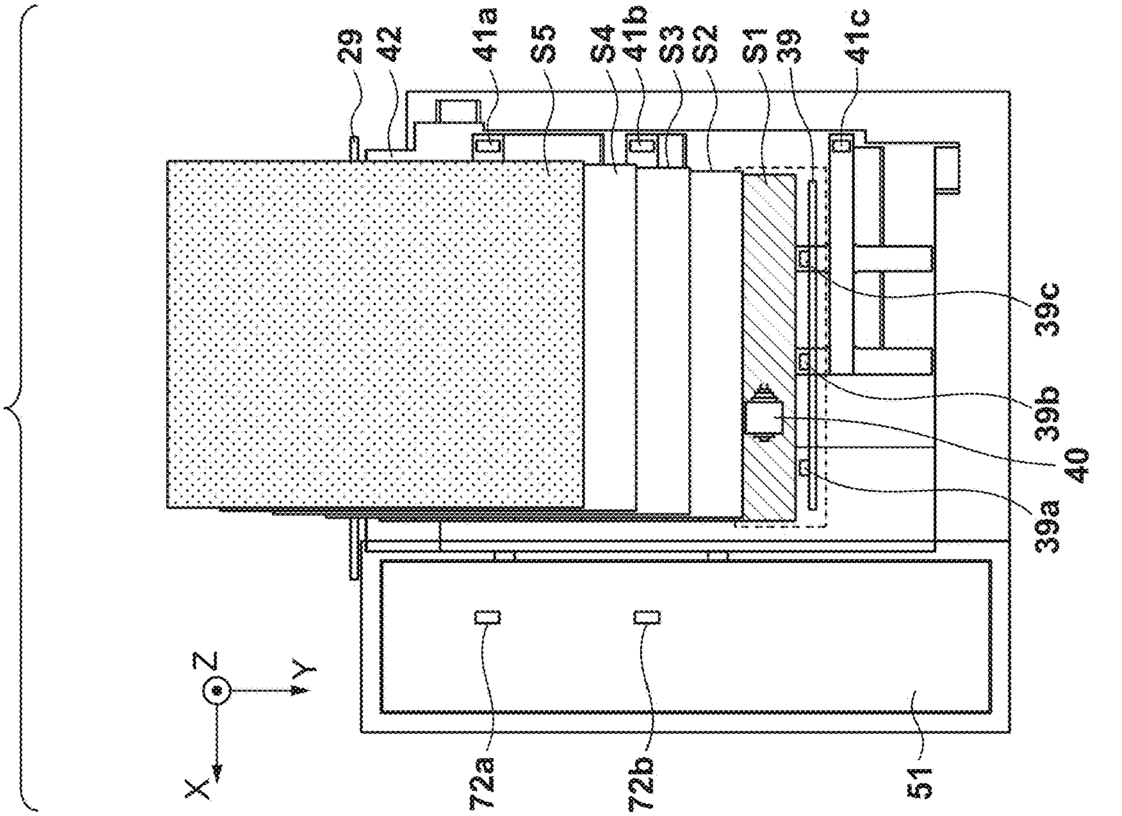

FIG. 3B illustrates the back end of the first sheet S1 having passed the nip of the kick-out roller 29, and the front end of the sheet S1 arriving at the vertical alignment roller 40. The sheet S1 abuts the vertical alignment plate 39 and is aligned using the position of the vertical alignment plate 39 as the reference. By continuously rotating the vertical alignment roller 40, following on from the sheet S1, the sheets S2 to S5 arriving at the vertical alignment roller 40 are abutted in order with the vertical alignment plate 39. Accordingly, the five sheets S1 to S5 are aligned in the Y direction (vertical direction) using the position of the vertical alignment plate 39 as the reference.

(3-3) Horizontal Alignment Stage

Figure 3D:
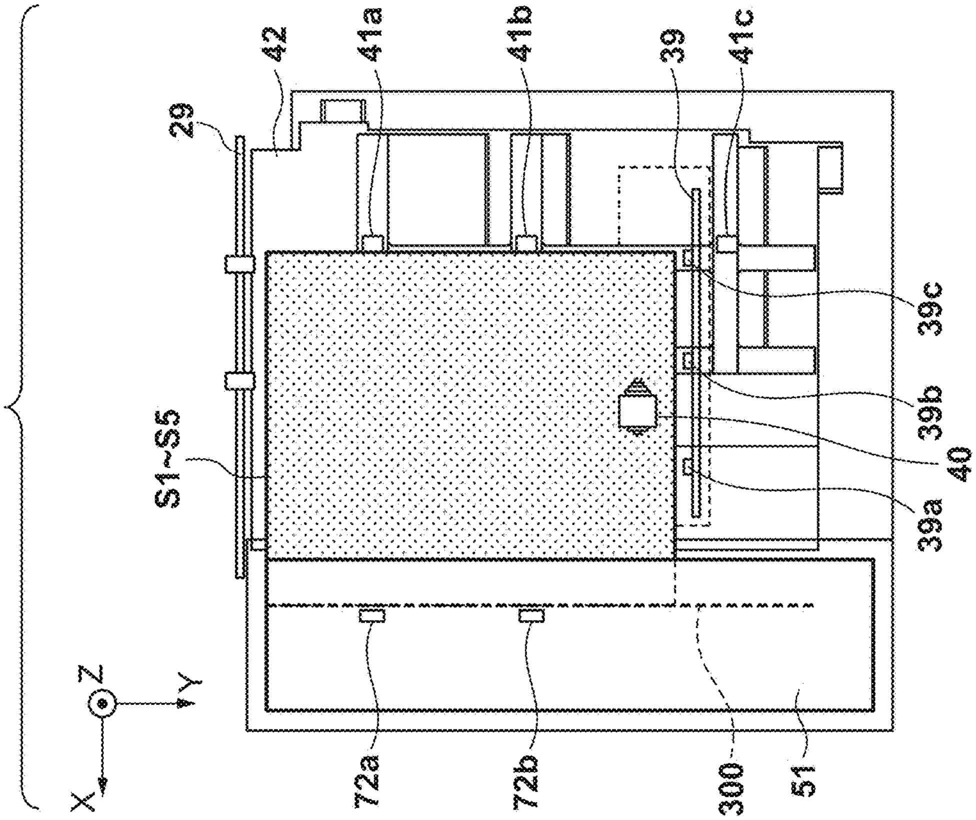
Figure 3C:
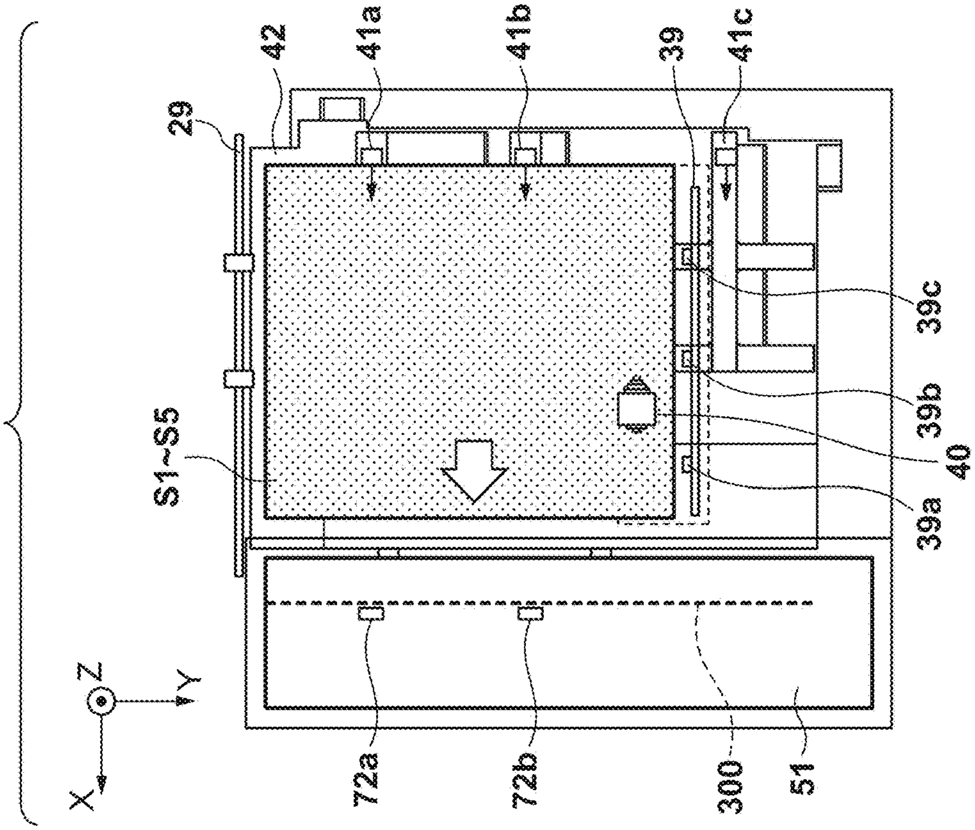

FIG. 3C illustrates alignment in the X direction (horizontal direction) having started after the alignment in the Y direction (vertical direction) of the sheets S1 to S5 has been completed. The horizontal alignment joggers 41*a* to 41*c* are driven in the X direction, the alignment direction, abutted against the side ends of the sheets S1 to S5, and push the sheets S1 to S5 toward the horizontal alignment plates 72*a* and 72*b*. Then, by abutting the other side ends of the sheets S1 to S5 against an abutting surface 300 of the horizontal alignment plates 72*a* and 72*b*, the sheets S1 to S5 are aligned in the X direction (horizontal direction) using the position of the horizontal alignment plates 72*a* and 72*b* as the reference.

(3-4) Bonding Stage (Thermocompression Bonding Stage)

FIG. 3D illustrates the state when aligning the five sheets S1 to S5 in the X direction and the Y direction is complete. The target position (alignment position) in the alignment operation is the position of the sheet bundle W for when the bonding process (thermocompression bonding) is performed by the thermocompression bonding unit 51. As described above, the image forming apparatus 100 applies the adhesive toner Tn to the sheets S1 to S5 so that the side where the adhesive toner image is formed is on the side of the thermocompression bonding unit 51. In a case where the sheet S1 is the cover of the booklet, the adhesive toner Tn is not applied.

The thermocompression bonding unit 51 performs the thermocompression bonding operation on the sheets S1 to S5 after alignment is complete. During this time, the horizontal alignment joggers 41*a* to 41*c* retract in the −X direction. Accordingly, the intermediate stacker 42 is put in a state in which the next plurality of sheets S can be received. Thereafter, the sheet bundle W including the sheets S6 to S10 generated at the buffering portion 80 are stacked on the sheets S1 to S5.

Thereafter, the four stages described above are repeated for the sheets S1 to S10. Accordingly, the sheets S1 to S10 are bonded in a highly-accurately aligned state.

As an example, the sheet bundle W includes five sheets S. However, the number of the sheets S forming the sheet bundle W may be two, three, or the like. In other words, the number of the sheets S included in the sheet bundle W is equal to or less than the maximum number of the sheets S that can be layered at the buffering portion 80.

(4) Process Cartridge

Figure 4:
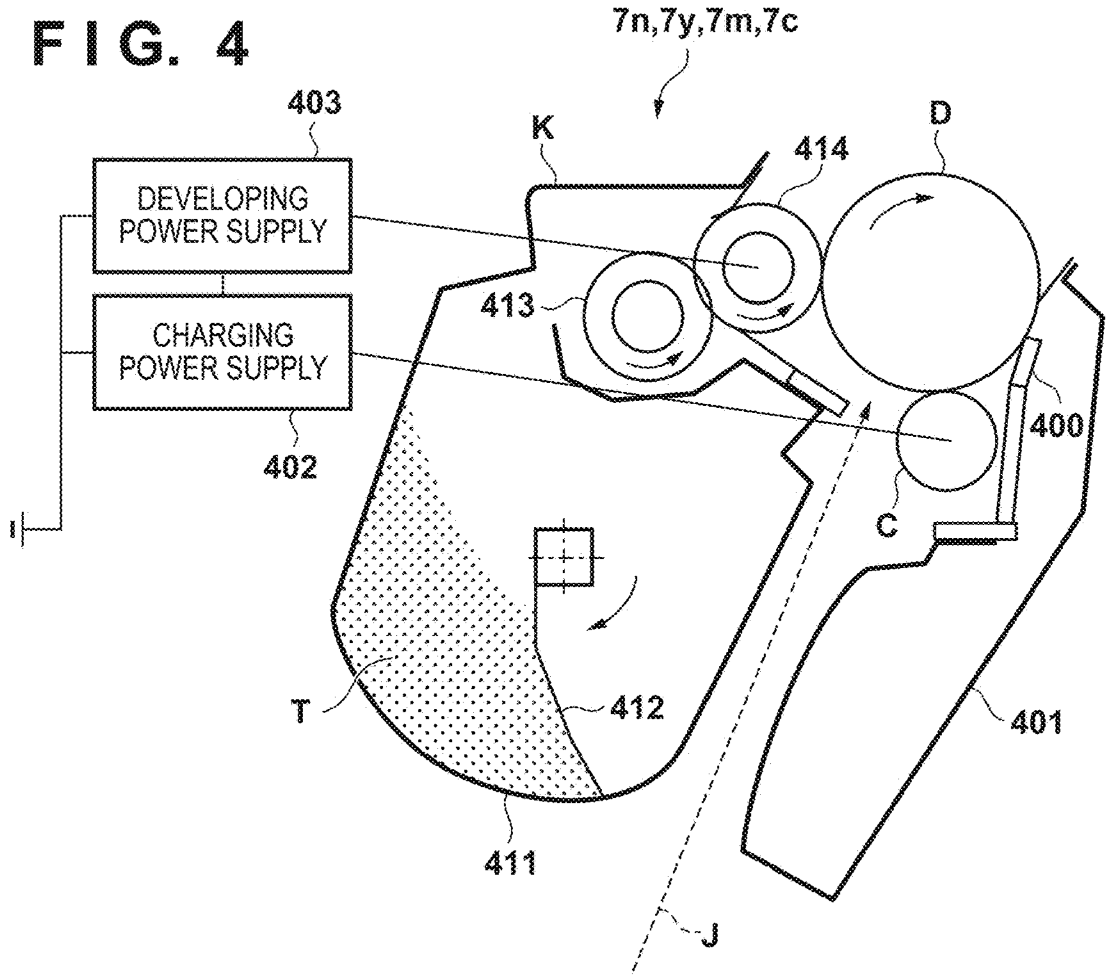
FIG. 4 is a diagram for explaining a process cartridge.

FIG. 4 is a cross-sectional view of the process cartridges 7*n*, 7*y*, 7*m*, and 7*c*. A cleaning blade 400 scrapes up the toner remaining on the surface of the photosensitive drum D, with the toner being collected in a collection container 401. A charging roller C charges the surface of the photosensitive drum D while a charging bias is applied from a charging power supply 402. The charging roller C is an electrically conductive elastic roller. The charging roller C includes a core metal and an electrically conductive elastic layer covering the core metal. The diameter of the core metal of the charging roller C is 6 mm, for example. The diameter of the electrically conductive elastic layer is 12 mm. The charging roller C is in contact with the photosensitive drum D and applies a predetermined pressing force. By a laser beam J being emitted from the exposure apparatus 2, an electrostatic latent image is formed on the surface of the photosensitive drum D.

A developing apparatus K includes a toner container 411 containing toner T. A stirring member 412 rotates to charge the toner T while stirring it. A supplying roller 413 supplies the toner T held in the toner container 411 to a developing roller 414. A developing bias is applied to the developing roller 414 from a developing power supply 403. The developing roller 414 forms a toner image by adhering the toner on the photosensitive drum D.

(5) Photosensitive Drum

Figure 5:
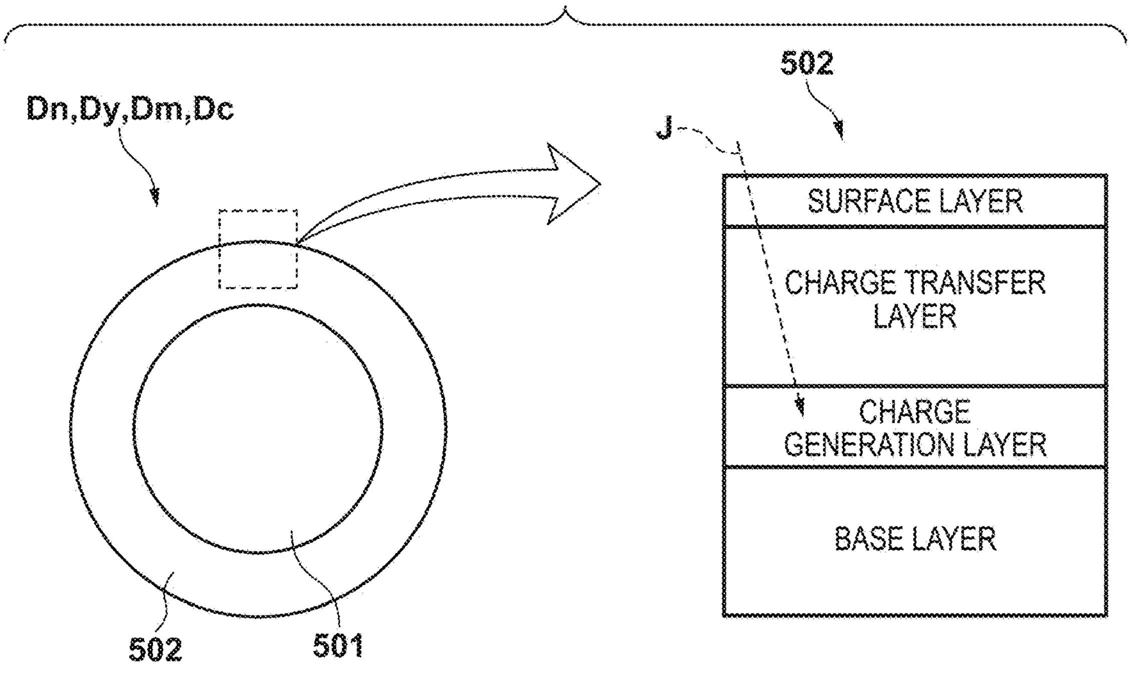
FIG. 5 is a diagram for explaining a photosensitive layer.

FIG. 5 illustrates the structure of the photosensitive drum Dn, Dy, Dm, and Dc. The photosensitive drum D includes a core metal 501 and a photosensitive layer 502 covering the core metal 501. The photosensitive layer 502 includes a surface layer, a charge transfer layer, a charge generation layer, and a base layer. The diameter of the photosensitive drum D is ø24 mm, for example. The thickness of the photosensitive layer 502 is 31 m, for example. m is the abbreviation for micrometer. The thickness of the surface layer is 17 m, for example. When the charge generation layer is exposed with the laser beam J, a positive charge is generated from the charge generation layer. The positive charge moves to the surface layer through the charge transfer layer. This cancels out the negative charge of the surface of the photosensitive drum D.

(6) Decrease in Wear and Density of Photosensitive Drum

Figure 6:
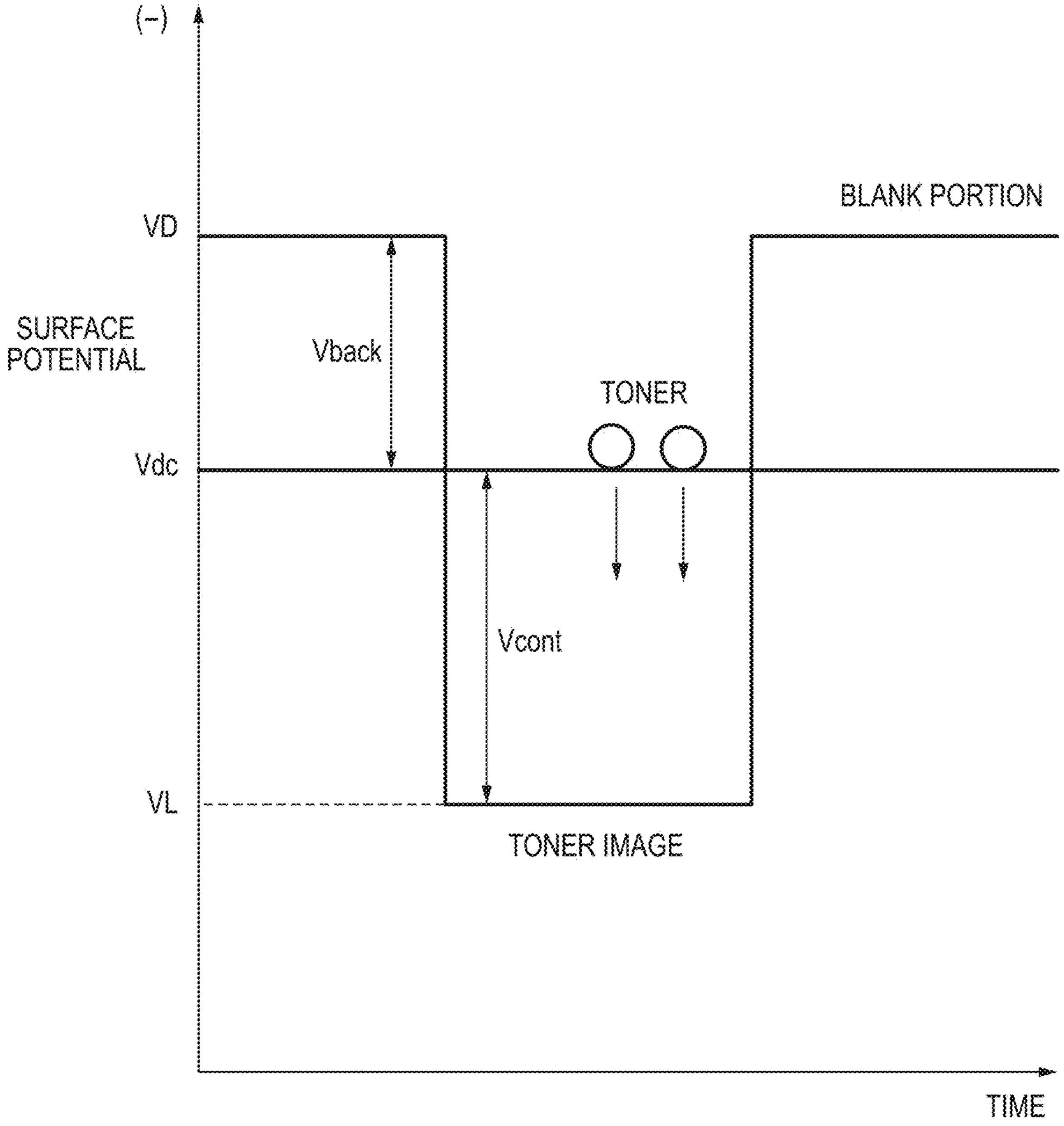
FIG. 6 is a diagram for explaining surface potential.

FIG. 6 is a diagram for explaining the potential of the photosensitive drum D when forming an image. The horizontal axis represents time. The vertical axis represents the surface potential of the photosensitive drum D. When the image formation operation starts, the charging power supply 402 applies a charging bias to the core metal of the charging roller C. When the potential difference between the potential of the surface of the photosensitive drum D and the potential of the charging roller C is equal to or greater than a discharge start voltage, discharge is started. Accordingly, the surface of the photosensitive drum D is uniformly charged. The surface potential of the photosensitive drum D becomes dark area potential VD. For example, assuming the charging bias is −1050 V, the dark area potential VD is −500 V (VD reference value).

When the laser beam J is emitted, the negative charge existing at the surface of the photosensitive drum D is canceled out. Accordingly, light area potential VL is formed on the surface of the photosensitive drum D. For example, in a case where the laser beam amount (hereinafter, referred to as exposure amount) is 0.2 $\mu J/cm^2$, the light area potential VL is 100 V.

A developing bias Vdc is approximately −250 V. The surface potential of the region of the surface of the photosensitive drum D where the toner image is formed is the light area potential VL. A potential difference Vcont between the developing bias Vdc and the light area potential VL corresponds to the electrical force when developing an electrostatic latent image on the photosensitive drum D using toner. Note that Vback illustrated in FIG. 6 is the potential difference between the dark area potential VD and the developing bias Vdc. Vback is the potential difference for suppressing toner adhering to non-exposure regions (toner fogging).

When transfer of the toner image is complete, the charging roller C returns the surface potential of the photosensitive drum D from the light area potential VL to the dark area potential VD. At this time, a discharge current flows from the charging roller C to the photosensitive drum D. All of the electrical energy of the discharge current is not used in charging the photosensitive drum D. A portion of the electrical energy of the discharge current electrically stimulates the polymeric material of the surface of the photosensitive drum D. As a result, the molecule bonds in the polymeric material become easier to break. As a result, the surface of the photosensitive drum D tends to wear more due to the sliding of the cleaning blade 400 and the like.

When the thickness of the photosensitive drum D decreases, the dark area potential VD of the photosensitive drum D increases in the negative direction. Coinciding with this, the light area potential VL of the photosensitive drum D also increases in the negative direction. However, the developing bias Vdc is constant. As a result, since the potential difference Vcont decreases, the density of the toner image formed on the sheet S decreases.

To make the image density constant, the light area potential VL needs to be kept constant. This is achieved by changing the exposure amount to correspond with the variation amount of the dark area potential VD of the photosensitive drum D.

Figure 7A:
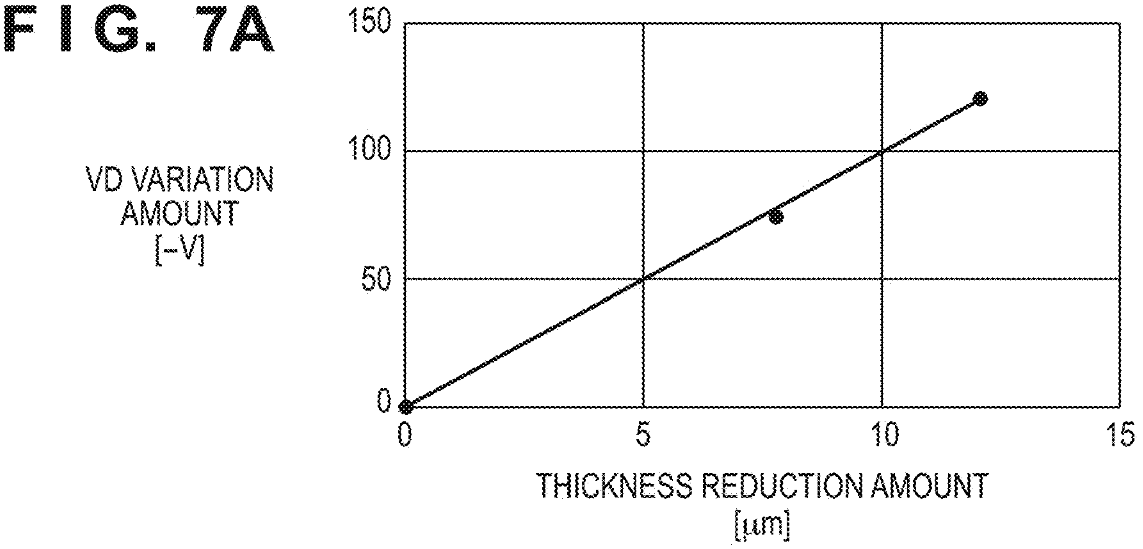
FIGS. 7A to 7C are graphs illustrating the exposure amount with respect to the VD variation amount and graphs illustrating the thickness reduction amount with respect to the number of passed sheets.
Figure 7B:
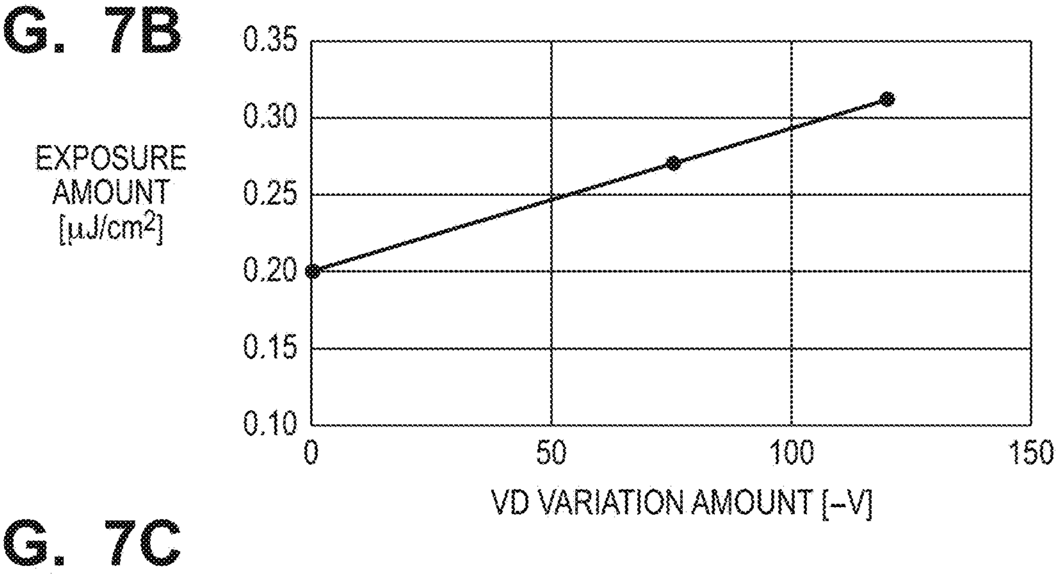

FIG. 7A illustrates the variation amount of the dark area potential VD with respect to the thickness reduction amount of the photosensitive drum D. Here, the charging bias is constant. FIG. 7B illustrates the exposure amount, with respect to the variation amount of the dark area potential VD, that is required for making the light area potential VL constant. As seen in FIG. 7A, the dark area potential VD increases in the negative direction as the thickness reduction amount increases. As seen in FIG. 7B, the density of the toner image is kept constant by the exposure amount changing to correspond with the variation amount of the dark area potential VD. Thus, the density is kept constant by changing the exposure amount to correspond with the thickness reduction amount.

Figure 8:
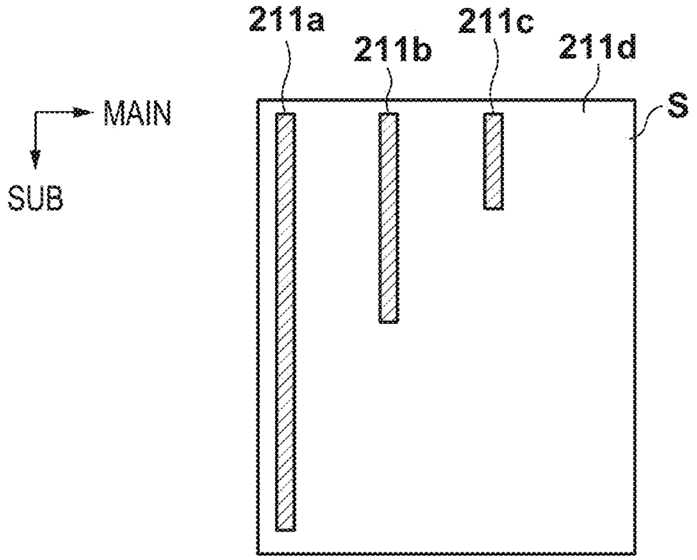
FIG. 8 is a diagram for explaining a test image.

FIG. 8 illustrates an example of the print regions 211*a* to 211*d* where the toner images are formed on the A4 sized sheet S. The lengths in the main scan direction of the print regions 211*a* to 211*d* are each 10 mm. The length in the sub-scan direction of the print region 211*a* is 287 mm. The length in the sub-scan direction of the print region 211*b* is 143.5 mm. The length in the sub-scan direction of the print region 211*c* is 28.7 mm. The print region 211*d* is a region with essentially nothing printed there. The print ratio of the print regions 211*a* to 211*d* are 100%, 50%, 10%, and 0%, respectively.

Figure 7C:
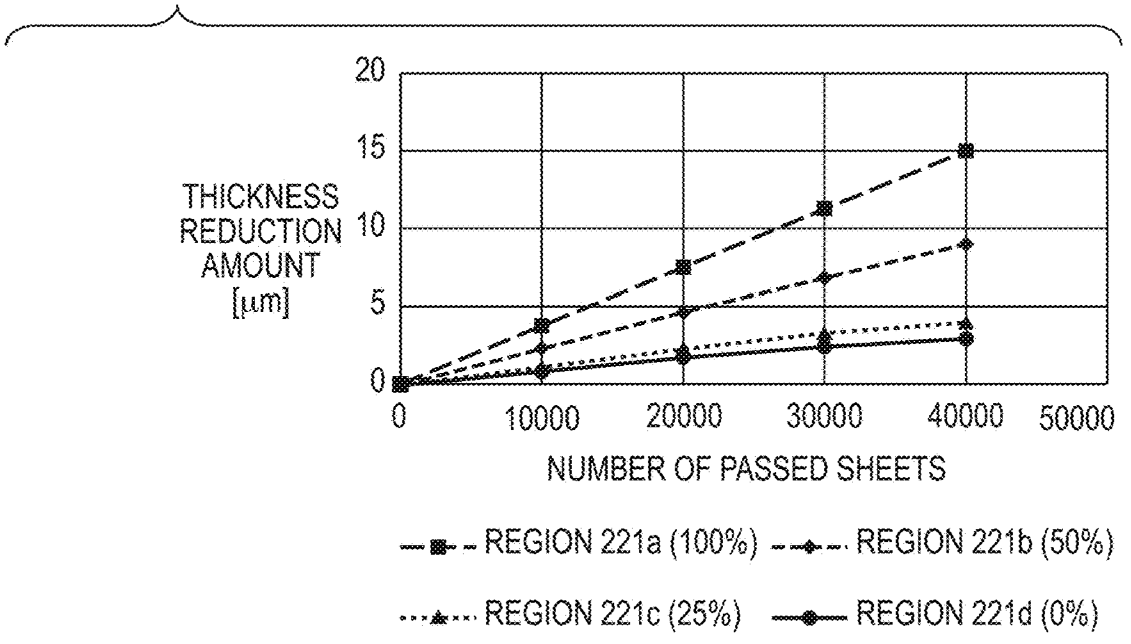

FIG. 7C illustrates the thickness reduction amount with respect to the number of passed sheets S where the toner images illustrated in FIG. 8 are printed. As seen in FIG. 7C, the thickness reduction amount increases with more surface region (exposure region) where a toner image with a high print ratio is formed. The number of discharges that occur at the surface layer of the photosensitive drum D increases corresponding to the print ratio. Thus, the thickness reduction amount increases as the print ratio increases.

In this manner, as images with a high print ratio are printed on more sheets S, the thickness of the surface layer of the photosensitive drum D tends to decrease. For example, in the image forming system 1 including a booklet manufacturing apparatus (post-processing apparatus 130), as illustrated in FIG. 2A, toner with a high print ratio is repeatedly printed at a specific main scanning position (print region 211). Thus, the thickness of the surface layer of the photosensitive drum D at the specific main scanning position significantly decreases. As a result, in the case of printing a toner image with a uniform density in the main scan direction, a significant disparity in the density in the main scan direction occurs.

(7) Number of Printed Pixels and Thickness Reduction Amount

The image forming apparatus 100 may include a counter (FIG. 13) as a unit that stores the print history. The counter cumulatively counts the number of pixels (number of printed pixels) printed with toner in the image to be printed. The cumulative number of printed pixels is referred to as the cumulative number of pixels. The count value of the counter is set to zero at the time the photosensitive drum D is newly manufactured. The counter continues to count until the photosensitive drum D is replaced.

For example, the number of printed pixels per one sheet S is obtained as follows. As a calculation condition, the resolution of the image forming portion 10 is assumed to be 600 dots per inch (dpi). The sheet S is an A4 sized sheet (length 297 mm×width 210 mm). The region of the sheet S where an image can be formed is 287 mm×200 mm. Thus, the number of printed pixels per one sheet S is 4724×6780 (=32,292,264). For example, the number of printed pixels when the print ratio is 50% is 16,014,632. The number of printed pixels when the print ratio is 10% is 3,202,926.

FIG. 9A illustrates an example of a counter. Memory addresses $E_{-100}$ to $E_{100}$ are distributed per 1 mm in the main scan direction of the photosensitive drum D. In this example, since the main scan direction is divided into 201 exposure regions, the 201 memory addresses $E_{-100}$ to $E_{100}$ exist. In a case where the main scan direction is divided into N exposure regions, N memory addresses are provided. In this manner, one memory address is allocated for each exposure region. The counter cumulatively counters the number of printed pixels per memory address. The cumulative number of pixels correlates to the thickness reduction amount. Thus, the thickness reduction amount may be obtained from the cumulative number of pixels. Note that the memory address distribution here is merely an example and can be changed.

Figure 10A:
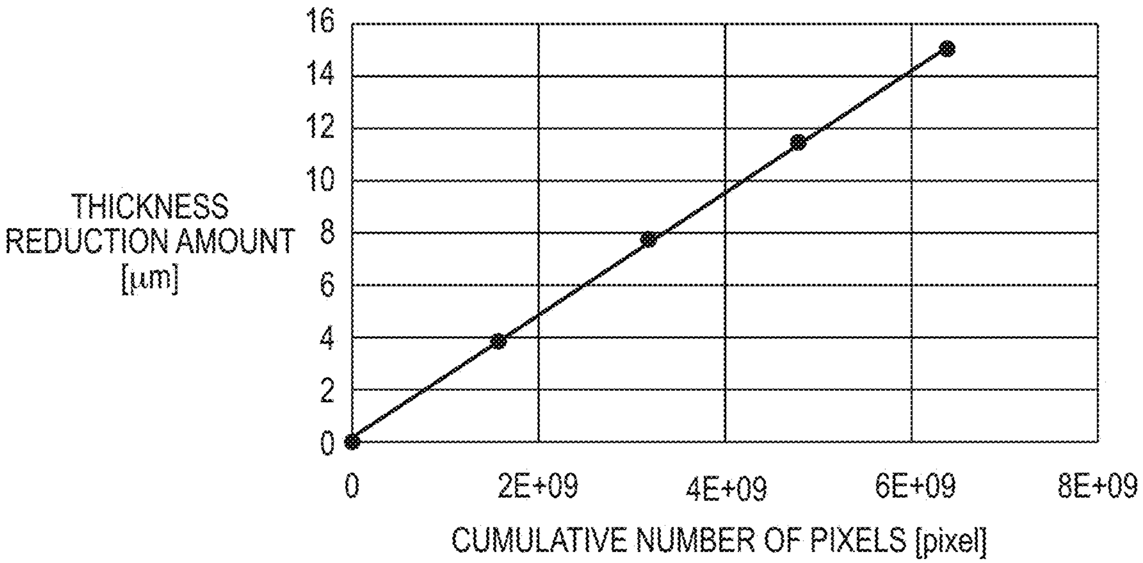
FIGS. 10A and 10B are graphs illustrating the thickness reduction amount and exposure amount with respect to the cumulative number of pixels.

FIG. 10A illustrates the thickness reduction amount with respect to the number of printed pixels. This is obtained by converting the print ratio of the results of the thickness reduction amount illustrated in FIG. 7C to number of printed pixels. For example, it is assumed that the print ratio of the print region 211*a* is 100% and the width of the main scan direction of the print region 211*a* is 1 mm, and the number of printed pixels of the print region 211*a* is cumulated. The thickness of the surface layer of the photosensitive drum D at the print region 211*d* where an image is not printed is used as a reference value. The thickness reduction amount of the print region 211*a* is measured from the difference between the thickness of the surface layer of the photosensitive drum D at the print region 211*a* and the reference value.

As seen in FIG. 10A, when the cumulative number of pixels increases, the thickness reduction amount also increases. This is because discharge occurs at the surface of the photosensitive drum D each time a toner image is printed and the amount of wear of the photosensitive drum D increases corresponding to the number of printed pixels.

(8) Exposure Amount Correction Using Number of Printed Pixels

Figure 10B:
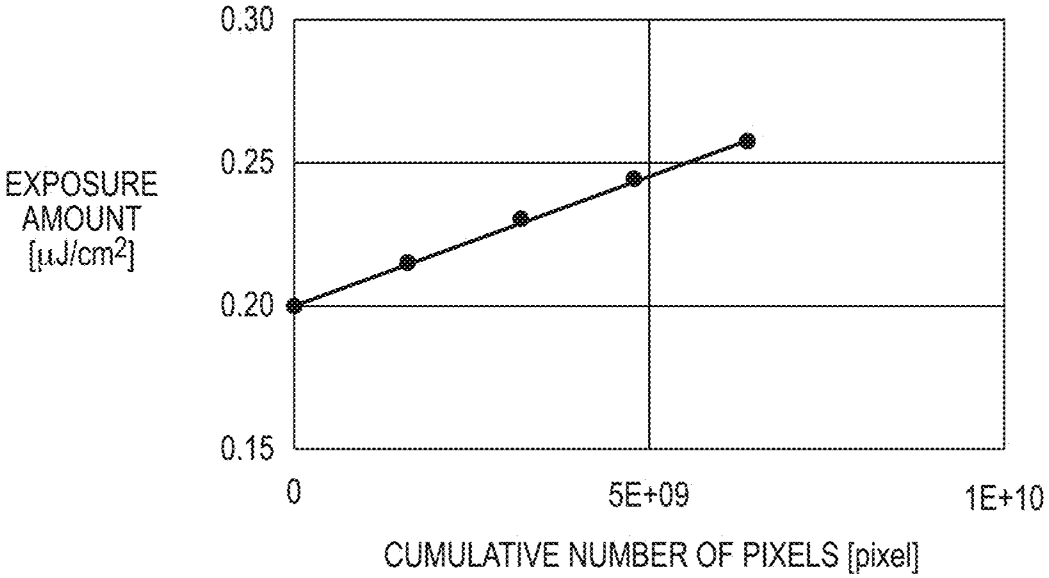

The image forming apparatus 100 predicts the thickness reduction amount from the cumulative number of pixels per main scanning position (region) and corrects the exposure amount on the basis of the prediction value to make the density of the printed images constant. FIG. 10B illustrates the exposure amount with respect to the cumulative number of pixels for keeping the density of the printed images constant. As described using FIGS. 7A, 7B, and 10A, the relationship between the cumulative number of pixels and the thickness reduction amount, the relationship between the thickness reduction amount and the variation amount of the dark area potential VD, and the relationship between the variation amount of the dark area potential VD and the exposure amount are taken into account. As a result, an exposure amount Pi corresponding to a cumulative number of pixels Mi for the i-th region is obtained via the following formula.

$$\begin{aligned} Pi &= Pa \times Mi + Pb \\ &= 2.2 \times 10^{-11} \times Mi + 0.2 \end{aligned} \quad \text{EQ. 1}$$

Here, Pa is a first correction coefficient. Pb is a second correction coefficient. These correction coefficients may be different due to the type of the toner, the type of the photosensitive drum D, the memory address distribution method, and the like. Thus, these correction coefficients may be changed according to related information (for example, toner type) input by the user. The image forming apparatus 100 can decrease the disparity in density in the main scan direction of the photosensitive drum D by correcting the exposure amount corresponding to the cumulative number of pixels per main scanning position.

(9) Effects of First Embodiment

FIG. 11 is a table indicating the effects of the first embodiment. Comparative Example I is a case in which the exposure amount is not changed corresponding to the cumulative number of pixels. Comparative Example II is a case in which the exposure amount uniformly increases in the main scan direction corresponding to the number of sheets printed. As the print condition, the environment temperature was 23° C. The environment humidity was 50% RH. The resolution was 600 dpi. The sheet S was A4 sized (length 297 mm×width 210 mm) GFC-081 (high white paper). Here, only the process cartridge 7*n* was used.

Figure 12:
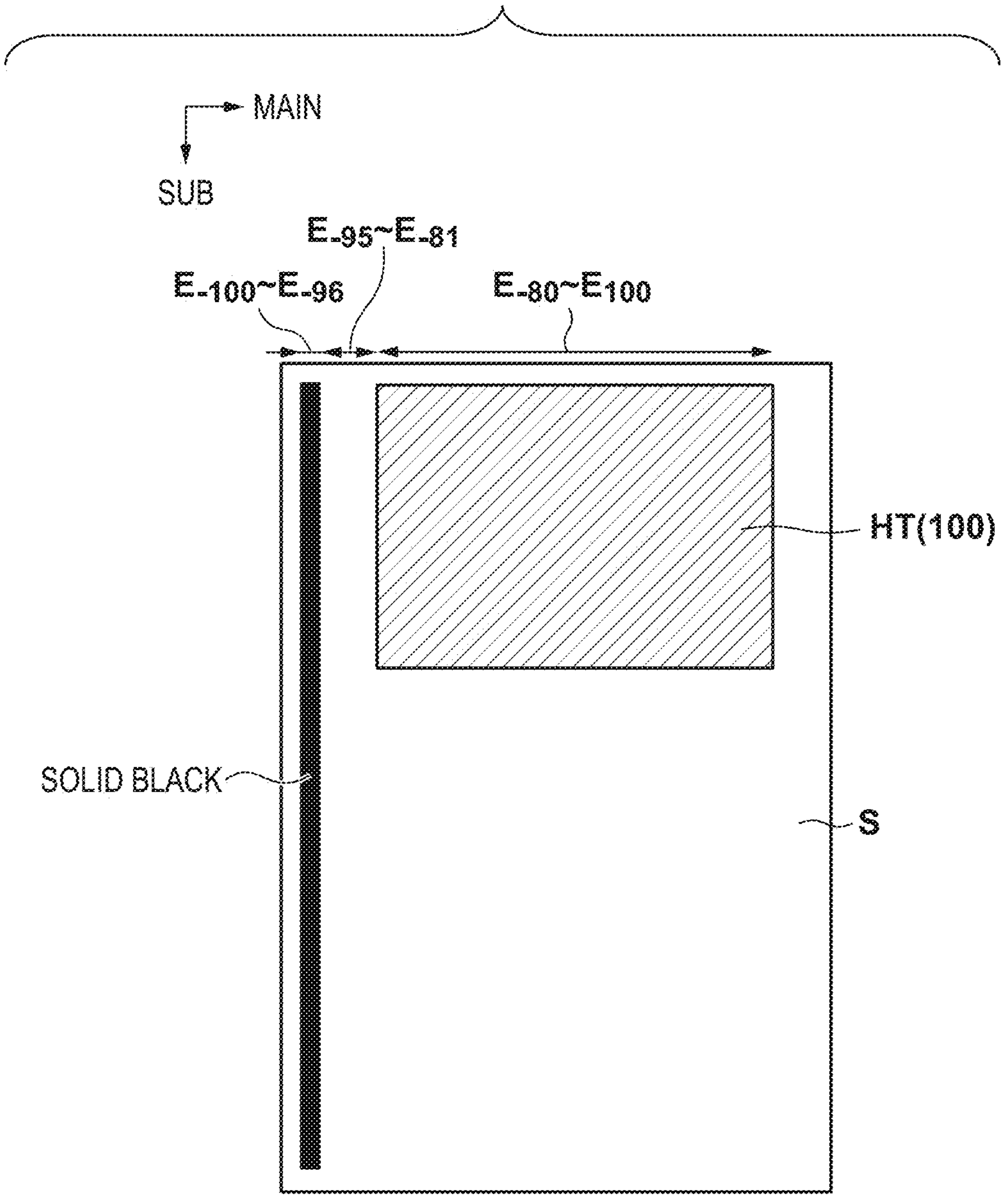
FIG. 12 is a diagram for explaining a test image.

FIG. 12 illustrates a test image printed on the sheet S. An image (hereinafter referred to as solid black) with an input grayscale value of 255 (maximum value for 8 bits) is printed in a region corresponding to the memory addresses $E_{-100}$ to $E_{-96}$. In the region corresponding to the memory addresses $E_{-95}$ to $E_{-81}$, nothing is printed (hereinafter referred to as solid white). A halftone image (hereinafter referred to as HT(100) image) with an input grayscale value of 100 is printed in a region corresponding to the memory addresses $E_{-80}$ to $E_{100}$. Using these conditions, the test image was formed on 200000 sheets S. Thereafter, the image density of the region corresponding to the memory addresses $E_{-100}$ to $E_{-96}$ and the image density of the region corresponding to the memory addresses $E_{-80}$ to $E_{100}$ were measured.

To evaluate the change in density due to printing, first, a reference value was obtained. The image density for the solid black region, the HT(100) image region, and the region corresponding to the memory addresses $E_{-95}$ to $E_{-81}$ were each measured out of five points. The Macbeth RD-918 was used as the reflective densitometer. The average value was obtained from the five point measurement values. The image density of the solid black was 1.44. The image density of the HT(100) image was 0.80. Using these values as reference values, it was evaluated as to whether each image density was within ±0.02.

As illustrated in FIG. 11, in the Comparative Example I, the image density of the solid black was 1.39. The image density of the HT(100) image was 0.74. These are both lower than their respective reference values.

In the Comparative Example II, the image density of the solid black was 1.45, a value almost the same as the reference value. However, the image density of the HT(100) image was 0.91, a value higher than the reference value. In the Comparative Example II, the exposure amount is uniformly corrected at all of the main scanning positions corresponding to the number of passed sheets S. Thus, at the region of the surface of the photosensitive drum D where toner is not printed, the exposure amount increases excessively, and the image density increases.

In the first embodiment, the exposure amount is corrected corresponding to the cumulative number of pixels of each main scanning region. As a result, the image density of the solid black was 1.44. The image density of the HT(100) image was 0.81. Both are similar to their respective reference values.

In this manner, according to the first embodiment, the exposure amount is corrected corresponding to the cumulative number of pixels per main scanning region. Thus, the density of each main scanning region is made substantially constant, and the disparity in density of the image in the main scan direction is reduced.

(10) Control System

Figure 13:
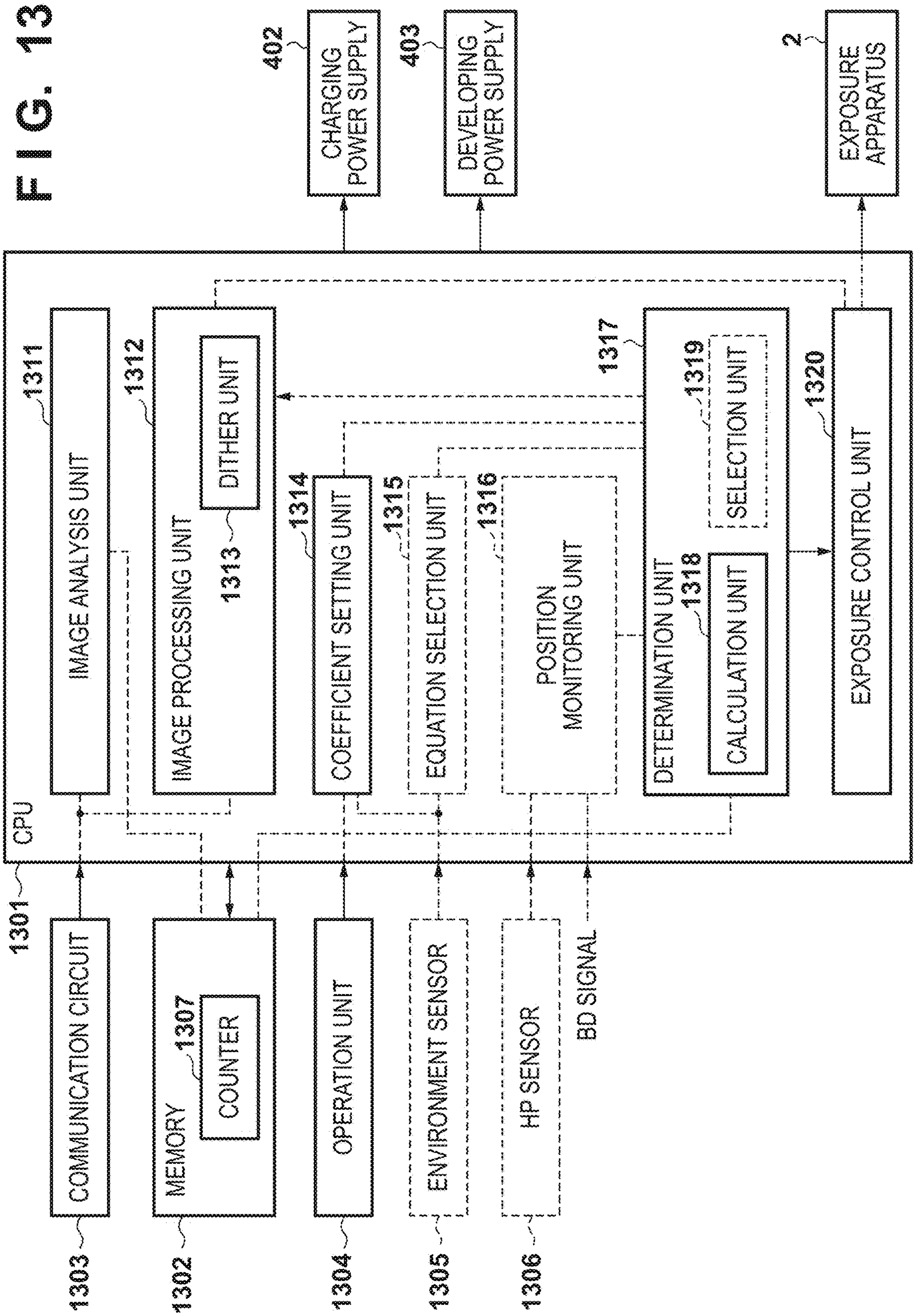
FIG. 13 is a diagram for explaining the functions of a CPU.

FIG. 13 illustrates the functions implemented by a CPU 1301 of the image forming apparatus 100. A CPU 1301 implements various functions by executing a control program stored in a memory 1302. A communication circuit 1303 communicates with a host computer, image reader, or the like and receives image data. An image analysis unit 1311 analyzes the input image data, obtains the number of printed pixels for each of the N main scanning regions, and adds them to the cumulative number of pixels stored in a counter 1307. The counter 1307 is a storage area allocated in the memory 1302, for example. The cumulative number of pixels Mi for the i-th main scanning region is stored in the memory address Ei.

An image processing unit 1312 converts input image data to bitmap data, converts color space, and generates image signals (exposure signals) to be supplied to the exposure apparatus 2. A dither unit 1313 executes dither processing on the image data.

An operation unit 1304 includes an input apparatus and a display apparatus. A coefficient setting unit 1314 sets a first correction coefficient Pa and a second correction coefficient Pb in a determination unit 1317 on the basis of information input from the operation unit 1304. As described above, the coefficient setting unit 1314 may be input with the first correction coefficient Pa and the second correction coefficient Pb from the operation unit 1304. The coefficient setting unit 1314 may determine the first correction coefficient Pa and the second correction coefficient Pb according to the toner type or the like input from the operation unit 1304. As described below, the coefficient setting unit 1314 may determine the first correction coefficient Pa and the second correction coefficient Pb according to an environmental condition (for example, environment temperature or environment humidity) detected by an environment sensor 1305.

An equation selection unit 1315 selects the equation for calculating the exposure amount on the basis of the environment condition or the like used in other embodiments. An HP sensor 1306 detects an absolute position (home position) in the sub-scan direction of the photosensitive drum D used in other embodiments. A position monitoring unit 1316 identifies the coordinates of the surface region of the photosensitive drum D on the basis of a signal (vertical synchronizing signal) output from the HP sensor 1306 and a BD signal (horizontal synchronizing signal) output from the exposure apparatus 2 used in other embodiments. In the first embodiment, the position monitoring unit 1316 informs the determination unit 1317 and an exposure control unit 1320 of the current exposure region (the main scanning region in the first embodiment).

The determination unit 1317 determines the exposure amount Pi for each main scanning region on the basis of the cumulative number of pixels Mi. For example, a calculation unit 1318 calculates the exposure amount Pi in the i-th main scanning region on the basis of the first correction coefficient Pa, the second correction coefficient Pb, and the cumulative number of pixels Mi. A selection unit 1319 determines the contents of the dither processing to be applied to the i-th main scanning region according to the cumulative number of pixels Mi and sets this in the dither unit 1313.

The exposure control unit 1320 controls the exposure apparatus 2 so that the i-th main scanning region of the photosensitive drum D is exposed to light by the exposure amount Pi designated by the determination unit 1317. The CPU 1301 also controls the charging power supply 402 and the developing power supply 403.

(11) Flowchart

(11-1) Cumulative Number of Pixels Count

Figure 14:
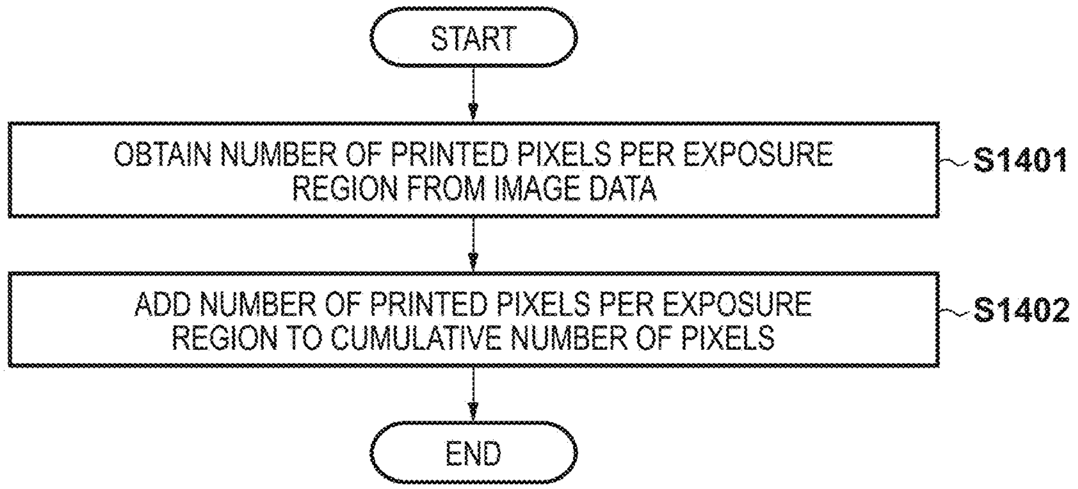
FIG. 14 is a flowchart illustrating a method for counting the cumulative number of pixels.

FIG. 14 illustrates the count processing executed according to a control program by the CPU 1301.

In step S1401, the CPU 1301 (image analysis unit 1311) obtains the number of printed pixels per exposure region (main scanning region in the first embodiment) from the image data.

In step S1402, the CPU 1301 (image analysis unit 1311) adds the number of printed pixels per exposure region to the cumulative number of pixels stored in the counter 1307.

(11-2) Exposure Control

Figure 15:
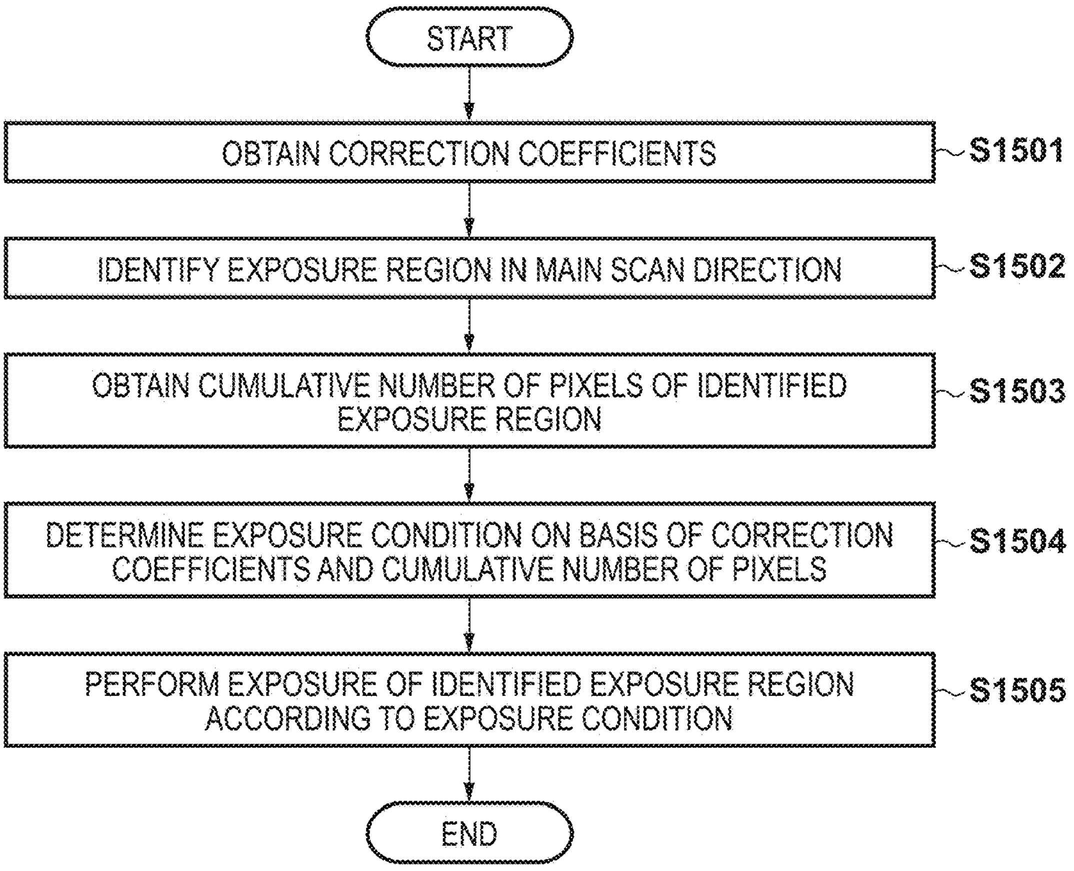
FIG. 15 is a flowchart illustrating a method for determining the exposure condition.

FIG. 15 illustrates the exposure control executed according to a control program by the CPU 1301.

In step S1501, the CPU 1301 (coefficient setting unit 1314) obtains the first correction coefficient Pa and the second correction coefficient Pb.

In step S1502, the CPU 1301 (position monitoring unit 1316) identifies the exposure region (main scanning region) in the main scan direction.

In step S1503, the CPU 1301 (determination unit 1317) obtains the cumulative number of pixels of the identified exposure region from the counter 1307.

In step S1504, the CPU 1301 (determination unit 1317) determines the exposure condition on the basis of the first correction coefficient Pa, the second correction coefficient Pb, and the cumulative number of pixels. The exposure condition is the exposure amount Pi determined using Formula EQ. 1, for example.

In step S1505, the CPU 1301 (exposure control unit 1320) performs exposure of the identified exposure region according to the exposure condition. Note that the steps from S1501 to S1505 are repeated while the toner image is being formed on the basis of the image data.

Second Embodiment

(1) Basic Concept of Second Embodiment

The items that the second embodiment has in common with the first embodiment are given the same reference sign as in the first embodiment and description thereof is omitted.

The items not described in the second embodiment are as described in the first embodiment.

In the first embodiment, the exposure amount is determined per main scanning region using the cumulative number of pixels Mi. As illustrated in FIG. 2A, in a case where an adhesive image is always drawn in the specific print region 211 in the main scan direction, the first embodiment is effective. This is because the surface layer wears (thickness decreases) substantially uniformly in the sub-scan direction of the photosensitive drum D. However, when an image is continuously printed in cycles of approximately 76 mm similar to the outer circumference length of the photosensitive drum D, wear may be accelerated at only a portion in the sub-scan direction of the photosensitive drum D. Regarding this, in the second embodiment, memory addresses are distributed in both the main scan direction and the sub-scan direction of the photosensitive drum D. In other words, the circumferential surface (surface) of the photosensitive drum D is divided into a plurality of exposure regions arranged in a matrix pattern, and the cumulative number of pixels are stored in the counter 1307 per exposure region. In this manner, even in a case where there is thickness reduction in a specific exposure region in the sub-scan direction, disparity in density is reduced across the entire surface of the sheet S.

FIG. 9B illustrates the distribution of memory addresses every 1 mm in both the main scan direction and the sub-scan direction of the photosensitive drum D. The plurality of exposure regions each with a size of 1 mm×1 mm are identified by the coordinates (x, y) including a main scanning position x and a sub-scan position y. Ex,y is the memory address storing a cumulative number of pixels Mx,y of the exposure region identified by coordinates (x, y).

The image analysis unit 1311 obtains the number of printed pixels at the coordinates (x, y) by analyzing the image data and adding this to the cumulative number of pixels Mx,y stored in the counter 1307.

The position monitoring unit 1316 identifies the coordinates (x, y) of the exposure region on the basis of the signal from the HP sensor 1306 and the BD signal from the exposure apparatus 2. The calculation unit 1318 of the determination unit 1317 calculates the exposure amount Px,y at the coordinates (x, y) from the cumulative number of pixels Mx,y using Formula EQ.1. Note that the exposure amount Pi of Formula EQ.1 is substituted for the exposure amount Px,y. The cumulative number of pixels Mi is substituted for the cumulative number of pixels Mx,y. The exposure control unit 1320 exposes the exposure region of the coordinates (x, y) to light on the basis of the exposure amount Px,y determined by the determination unit 1317.

(2) Description of Effects of Second Embodiment

Figure 16:
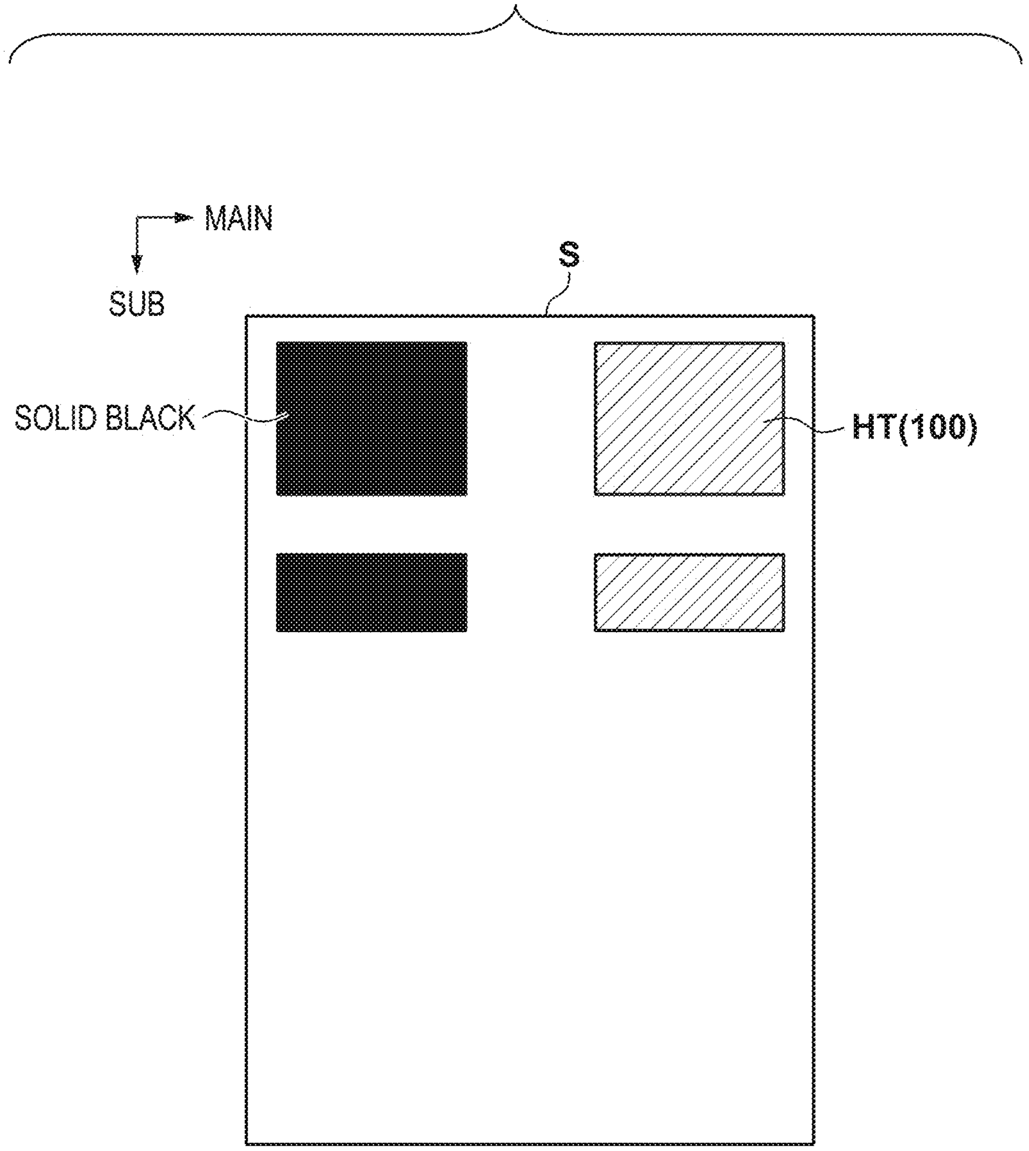
FIG. 16 is a diagram for explaining a test image.
Figure 17:
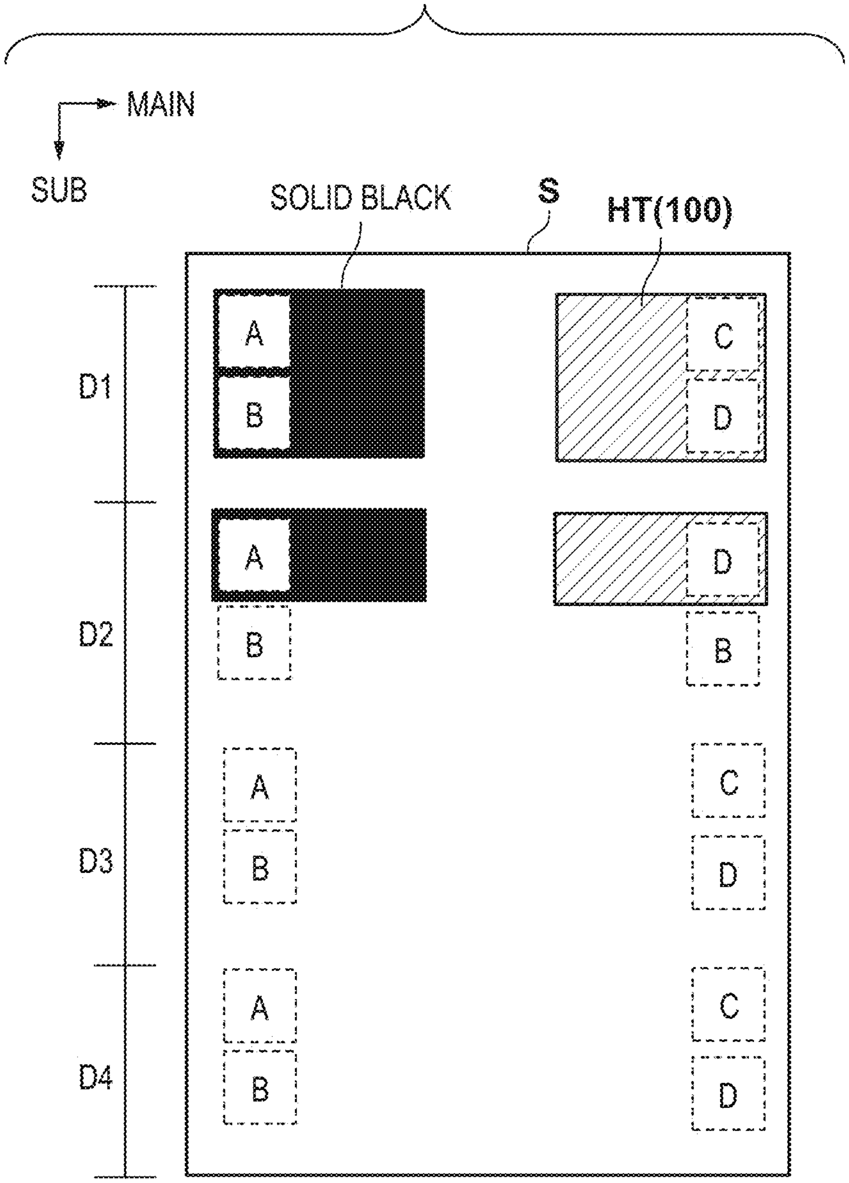
FIG. 17 is a diagram for explaining the relationship between the rotational cycle of the photosensitive drum and the test image.

For the second embodiment, experiments were carried out using experiment conditions similar to those of the first embodiment. FIG. 16 illustrates a test image formed on the sheet S. The image forming apparatus 100 always starts printing the solid image (value=255) and the HT(100) image which is a halftone image (value=100) from a specific position (home position) in the sub-scan direction. FIG. 17 illustrates the cycle of the photosensitive drum D with respect to the sheet S. Di indicates the position on the sheet S corresponding to the i-th cycle of the photosensitive drum D. i is an integer from 1 to 4.

The memory addresses $E_{-100,-38}$ to $E_{-80,-18}$ of the counter 1307 store the cumulative number of pixels of the exposure region A. The memory addresses $E_{-100,-0}$ to $E_{-80,-20}$ store the cumulative number of pixels of the exposure region B. The memory addresses $E_{80,-38}$ to $E_{100,-18}$ store the cumulative number of pixels of the exposure region C. The memory addresses $E_{80,0}$ to $E_{100,20}$ store the cumulative number of pixels of the exposure region D.

In the exposure region A, two solid blacks are printed on one sheet S. In the exposure region B, one solid black is printed on one sheet S. Since the number of solid blacks printed differ according to position in the sub-scan direction, the cumulative number of pixels is different per exposure region in the sub-scan direction. In the exposure region C, two HT(100) images are printed on one sheet S. In the exposure region D, one HT(100) image are printed on one sheet S.

The test image was formed on 400000 sheets S, and the image density of each exposure region was measured. The densometer, statistical method, evaluation method are as in the first embodiment. According to the second embodiment, the image density of each exposure region ABCD was confirmed to be roughly equal to the reference value.

(3) Flowchart

Figure 18:
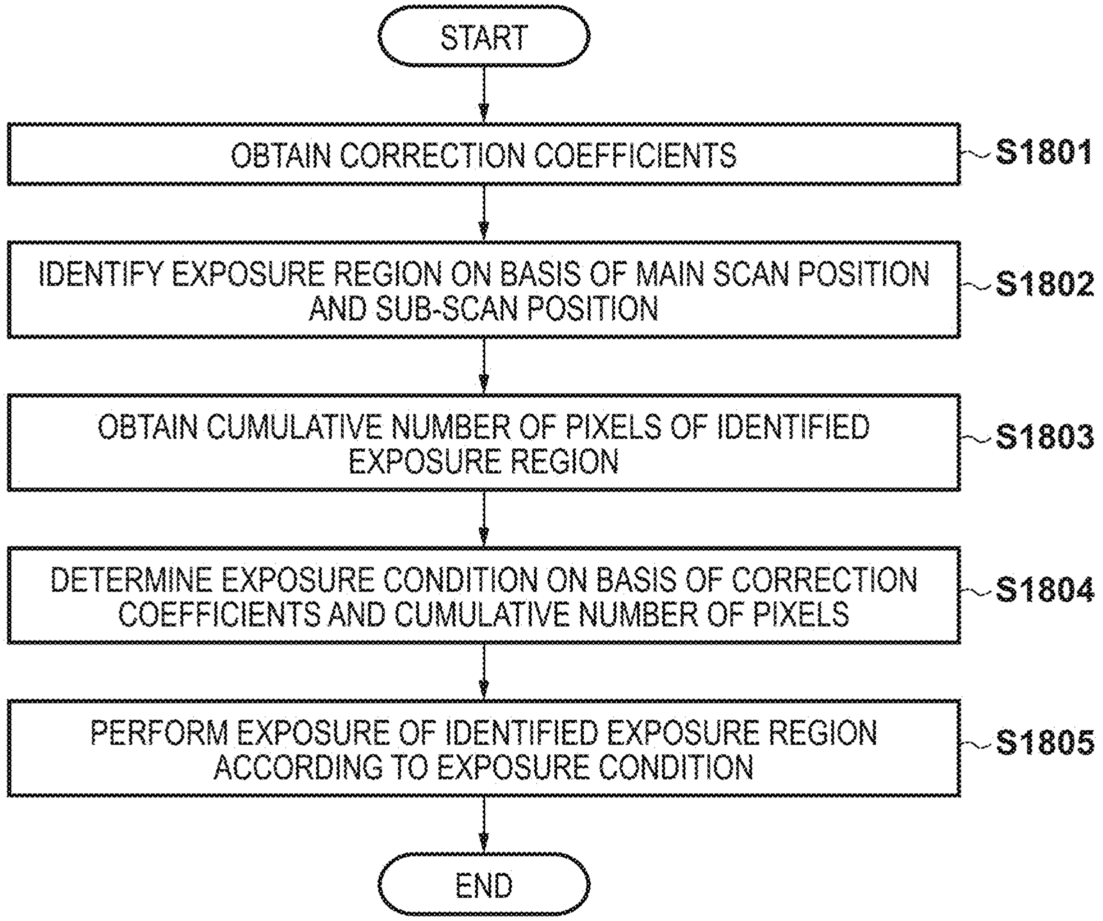
FIG. 18 is a flowchart illustrating a method for determining the exposure condition.

FIG. 18 illustrates the exposure control method executed according to a control program by the CPU 1301.

In step S1801, the CPU 1301 (coefficient setting unit 1314) obtains the first correction coefficient Pa and the second correction coefficient Pb.

In step S1802, the CPU 1301 (position monitoring unit 1316) identifies the exposure region on the basis of the main scanning position x and the sub-scan position y. In other words, the coordinates (x, y) of the exposure region for processing are identified.

In step S1803, the CPU 1301 (determination unit 1317) obtains the cumulative number of pixels of the identified exposure region from the counter 1307.

In step S1804, the CPU 1301 (determination unit 1317) determines the exposure condition on the basis of the first correction coefficient Pa, the second correction coefficient Pb, and the cumulative number of pixels. The exposure condition is the exposure amount Px,y, for example.

In step S1805, the CPU 1301 (exposure control unit 1320) performs exposure of the identified exposure region according to the exposure condition. Note that the steps from S1801 to S1805 are repeated while the toner image is being formed on the basis of the image data.

According to the second embodiment, memory addresses are distributed to combinations of the main scanning position x and the sub-scan position y of the photosensitive drum D. The circumferential surface of the photosensitive drum D is divided into a plurality of exposure regions arranged in a matrix pattern, and the cumulative number of pixels are stored per exposure region. Then, the exposure condition is determined per exposure region. In this manner, in not only the main scan direction but also the sub-scan direction, disparity in the density is reduced.

In the first embodiment, the main scan direction is divided into a plurality of exposure regions, and in the second embodiment, the entire surface of the photosensitive drum D is divided into a plurality of exposure regions. However, this is merely an example. Even in a case where the sub-scan direction is divided into a plurality of exposure regions (sub-scan regions), the concepts of the first embodiment and the second embodiment are applicable. In other words, the cumulative number of pixels may be stored per sub-scan regions, and the exposure amount of each sub-scan region may be determined according to the cumulative number of pixels.

Third Embodiment

(1) Basic Concept of Third Embodiment

The items that the third embodiment has in common with the first and second embodiment are given the same reference sign as in the first and second embodiment and description thereof is omitted. The items not described in the third embodiment are as described in the first and second embodiment.

The environment conditions of the first and second embodiment is expected to be constant (temperature=23° C., humidity=50% RH). However, the actual environment conditions may change. For example, the environment conditions may be low temperature and low humidity (for example, temperature=15° C., humidity=10% RH) or may be high temperature and high humidity (temperature=30° C., humidity=80% RH). The discharge voltage of the photosensitive drum D is dependent on the environment condition. However, the thickness reduction amount with respect to the cumulative number of pixels may change depending on the environment condition.

The thickness reduction amount with respect to the cumulative number of pixels dependent on three different environment conditions were measured. A normal condition (hereinafter, referred to as NN) is an environment temperature of 23° C. and an environment humidity of 50% RH. A low temperature low humidity condition (hereinafter, referred to as LL) is an environment temperature of 15° C. and an environment humidity of 10% RH. A high temperature high humidity condition (hereinafter, referred to as HH) is an environment temperature of 30° C. and an environment humidity of 80% RH. The test image illustrated in FIG. 8 was printed, and the thickness reduction amount with respect to the cumulative number of pixels was measured.

Figure 19A:
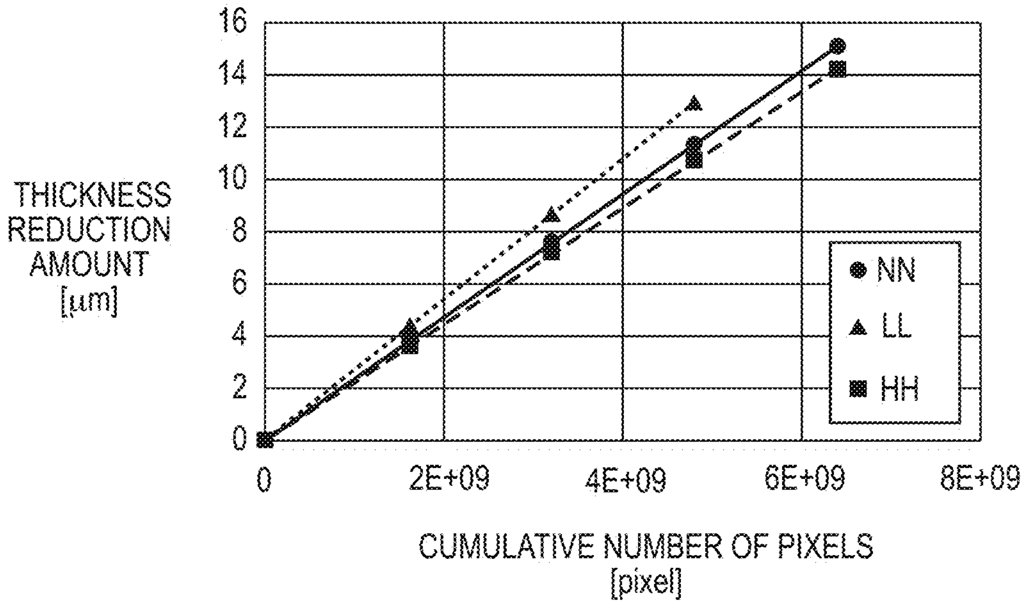
FIGS. 19A and 19B are graphs illustrating the thickness reduction amount and exposure amount with respect to the cumulative number of pixels.

FIG. 19A illustrates the thickness reduction amount with respect to the cumulative number of pixels corresponding to the differences in the environment conditions. With the LL environment, compared to the NN environment, the thickness reduction amount with respect to the cumulative number of pixels is increased. When the absolute humidity obtained from the environment temperature and the relative humidity is decreased, the discharge voltage at the photosensitive drum D is increased, and the surface layer of the photosensitive drum D tends to wear more. With the HH environment, compared to the NN environment, the thickness reduction amount with respect to the cumulative number of pixels is decreased.

Figure 19B:
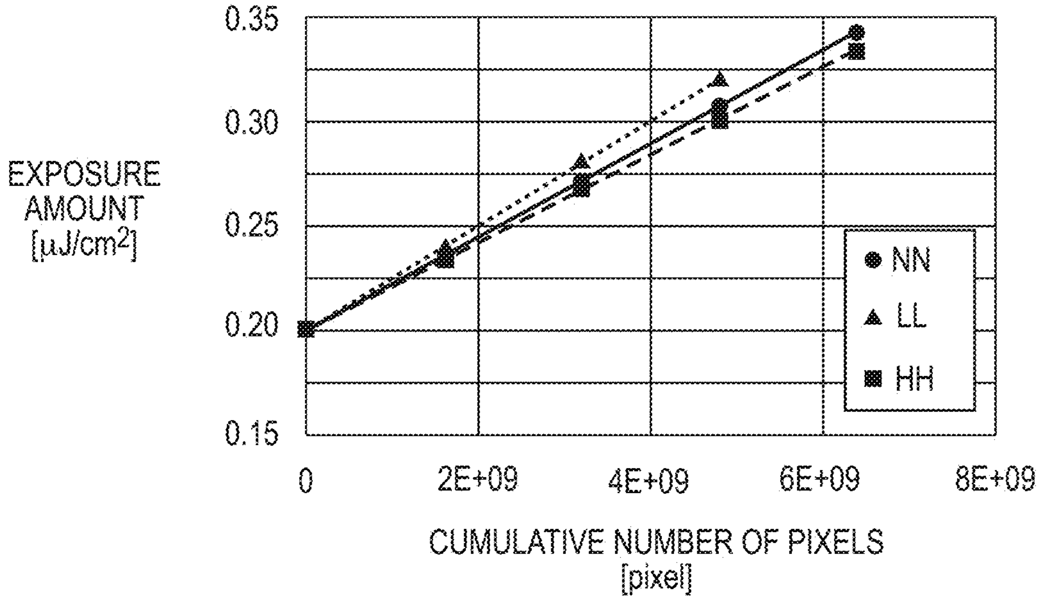

FIG. 19B illustrates the exposure amount required to make the density of the printed image constant with respect to the cumulative number of pixels per environment condition. The exposure amount corresponding to the cumulative number of pixels illustrated in FIG. 19B is dependent on the environment conditions. For example, the memory 1302 may store a plurality of correction formulas (equations) for obtaining the exposure amount from the cumulative number of pixels. Each of the plurality of equations are associated with different environment conditions (for example, environment temperature and environment humidity) in advance. The CPU 1301 (equation selection unit 1315) selects an equation corresponding to the combination of environment temperature and environment humidity obtained by the environment sensor 1305 from the plurality of equations. The calculation unit 1318 determines the exposure condition by substituting the cumulative number of pixels per exposure region with the selected equation.

(2) Description of Effects of Third Embodiment

Printing in the same experiment conditions as in the first embodiment was performed in the NN environment, the LL environment, and the HH environment, and the effects of the third embodiment were confirmed. As a result, in the third embodiment also, the image density of the solid black and the image density of the HT(100) image were confirmed to be within 0.02 of their reference values.

(3) Flowchart

Figure 20:
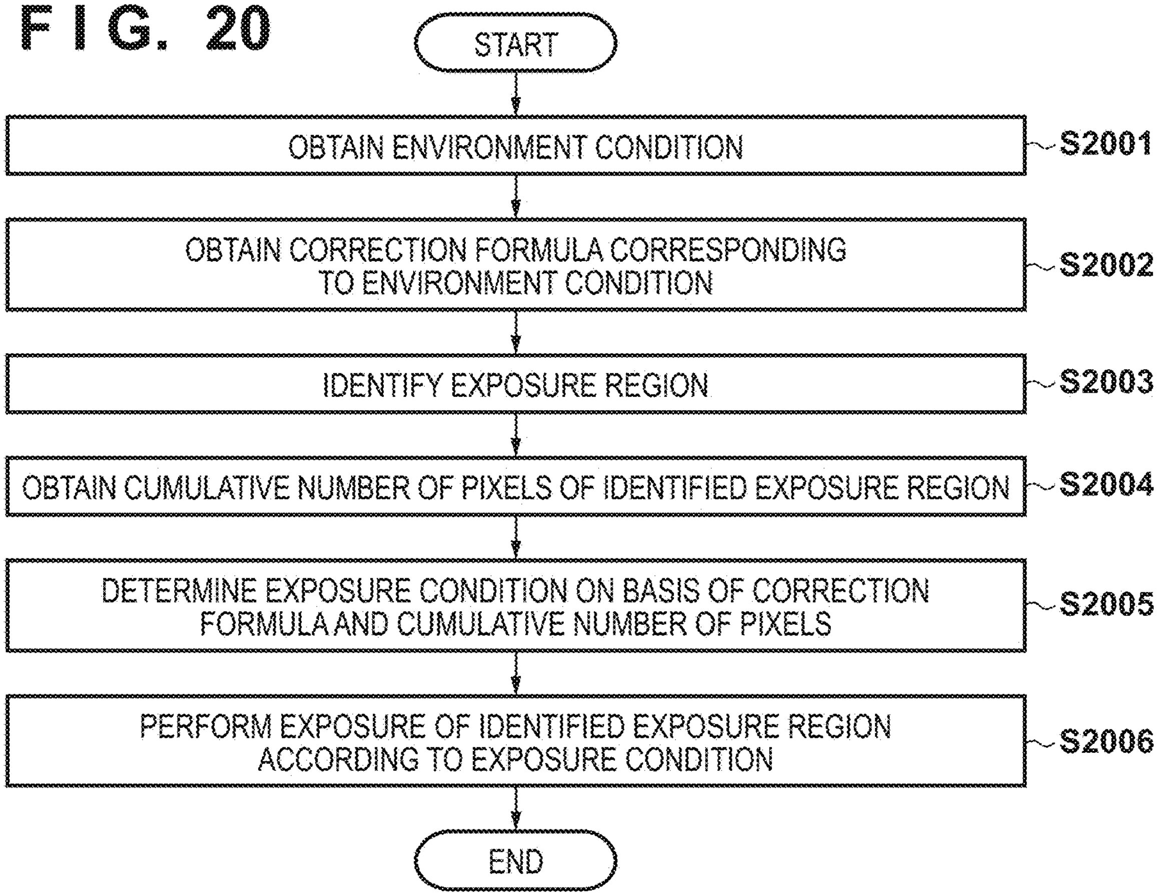
FIG. 20 is a flowchart illustrating a method for determining the exposure condition.

FIG. 20 illustrates the exposure control method executed according to a control program by the CPU 1301.

In step S2001, the CPU 1301 obtains the environment condition using the environment sensor 1305.

In step S2002, the CPU 1301 (equation selection unit 1315) obtains the first correction coefficient Pa and the second correction coefficient Pb corresponding to the environment condition. Note that in a case where the equation already includes the correction coefficient, step S2002 is not required.

In step S2003, the CPU 1301 (position monitoring unit 1316) identifies the exposure region. The exposure region identification method may be as in the first and second embodiment.

In step S2004, the CPU 1301 (determination unit 1317) obtains the cumulative number of pixels of the identified exposure region from the counter 1307.

In step S2005, the CPU 1301 (determination unit 1317) determines the exposure condition on the basis of the equation selected by the equation selection unit 1315 and the cumulative number of pixels. The exposure condition is the exposure amount Pi or the exposure amount Px,y, for example.

In step S2006, the CPU 1301 (exposure control unit 1320) performs exposure of the identified exposure region according to the exposure condition. Note that the steps from S2001 to S2006 are repeated while the toner image is being formed on the basis of the image data.

According to the third embodiment, the exposure condition is determined from the cumulative number of pixels using the equation corresponding to the environment condition. In this manner, disparity in image density is reduced even if the environment conditions change.

Fourth Embodiment

In the first to third embodiments, the exposure condition is determined per exposure region according to the cumulative number of pixels. Instead of this, the image processing condition (for example, dither processing) may be changed per exposure region according to the cumulative number of pixels. The image processing condition should be a condition that affects the image density.

Figure 21:
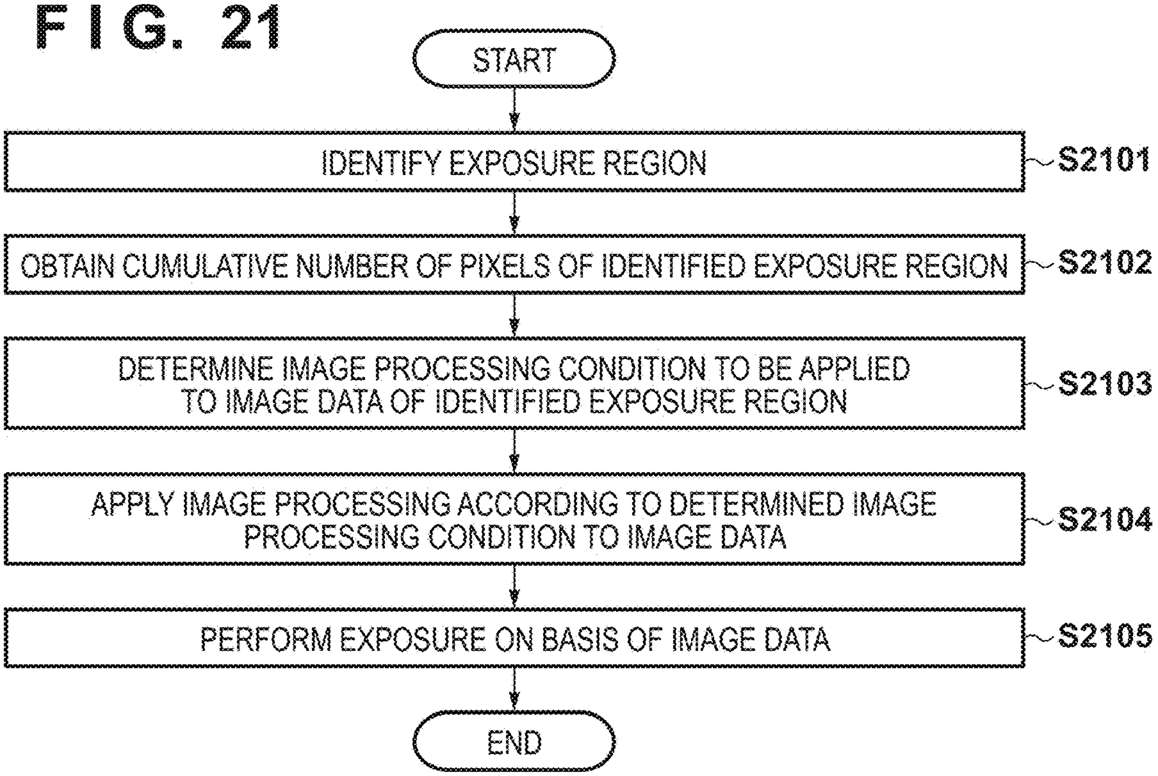
FIG. 21 is a flowchart illustrating a method for determining the image processing condition.

FIG. 21 illustrates the exposure control method executed according to a control program by the CPU 1301.

In step S2101, the CPU 1301 (position monitoring unit 1316) identifies the exposure region. The exposure region identification method may be as in the first and second embodiment.

In step S2102, the CPU 1301 (determination unit 1317) obtains the cumulative number of pixels of the identified exposure region from the counter 1307.

In step S2103, the CPU 1301 (selection unit 1319) determines the image processing condition to be applied to the image data of the identified exposure region on the basis of the cumulative number of pixels. The image processing condition may be the contents of the dither processing (for example, the error diffusion method or other dithering method), for example.

In step S2104, the CPU 1301 (dither unit 1313) applies image processing (for example, dither processing) according to the determined image processing condition to the image data.

In step S2105, the CPU 1301 (exposure control unit 1320) performs exposure of the identified exposure region on the basis of the image data. Note that the steps from S2101 to S2105 are repeated while the toner image is being formed on the basis of the image data.

Other Matters

The CPU 1301 may determine whether or not to apply the first to fourth embodiments in response to a user instruction input from the operation unit 1304. In other words, the CPU 1301 may switch from a normal mode in which correction is not performed and a correction mode in which correction is performed.

Technical Ideas Derived from Embodiments (Item 1)

The memory 1302 stores the cumulative image formation amount (for example, cumulative number of pixels Mi, Mx, y) for each one of the N exposure regions of the surface of the photosensitive body. The CPU 1301 and the determination unit 1317 are an example of a control circuit that determines the exposure condition on the basis of the cumulative image formation amount for each one of the N exposure regions. The CPU 1301 and the exposure control unit 1320 may control the exposure light source to expose each one of the N exposure regions to light according to the exposure condition. According to the present embodiment, since the exposure condition is determined on the basis of the cumulative image formation amount per exposure region, disparity in the density of the toner image is reduced more than in the related art.

(Item 2)

The CPU 1301 may determine the exposure condition for each one of the N exposure regions so that the exposure amount increases as the cumulative image formation amount increases. In this manner, the density of the toner image decreases as the cumulative image formation amount increases. Thus, by increasing the exposure amount, the density of the toner image is maintained and disparity in the density is reduced.

(Item 3)

The N exposure regions may be arranged in a first direction parallel with a rotary shaft of the photosensitive body. In this manner, disparity in the density in the first direction is decreased.

(Item 4)

The N exposure regions may be arranged in a second direction orthogonal to a first direction parallel with a rotary shaft of the photosensitive body. In this manner, disparity in the density in the second direction is decreased.

(Item 5)

The N exposure regions may be arranged in a matrix pattern on the surface of the photosensitive body. In this manner, disparity in the density across substantially the entire surface of the sheet S is decreased.

(Item 6)

The CPU 1301 may determine the exposure condition for each one of the N exposure regions on a basis of the cumulative image formation amount and the environment condition detected by the environment sensor 1305. In this manner, disparity in the density is reduced even if the environment conditions vary.

(Item 7)

The memory 1302 may function as a storage unit that stores a plurality of correction formulas (for example, equations) associated in a one-to-one relationship with a plurality of different environment conditions. The CPU 1301 may determine the exposure condition for each one of the N exposure regions by selecting, from among the plurality of correction formulas, a correction formula corresponding to the environment condition detected by the environment sensor 1305 and using the selected correction formula. In this manner, disparity in the density is more reliably reduced.

(Item 8)

The environment condition includes at least one of temperature and humidity. Here, temperature and humidity affect the discharge current that is produced at the surface of the photosensitive drum D. In other words, temperature and humidity affect the thickness reduction amount of the photosensitive drum D. Thus, by selecting the correction formula taking into account at least one of the temperature and the humidity, disparity in the density is more reliably reduced.

(Item 9)

The CPU 1301 may multiply the cumulative image formation amount for each one of the N exposure regions and a first correction coefficient (for example, Pa) to obtain a product, add a second correction coefficient (for example, Pb) to the product, and determine an exposure amount for the exposure condition. In this manner, disparity in the density is more reliably reduced.

(Item 10)

The first correction coefficient and the second correction coefficient may be determined according to the type of the toner. The types of the toner mainly relate to the material. Examples of the material include a polyester resin, a vinyl resin, an acrylic resin, a styrene acrylic resin, and the like. In this manner, by determining the exposure condition according to the toner type, disparity in the density is more reliably reduced.

(Item 11)

The first correction coefficient and the second correction coefficient may be determined according to the type of the photosensitive body. Examples of the photosensitive body type include, for example, the material of the photosensitive layer, thickness, and the like. In this manner, by determining the exposure condition taking these into account, disparity in the density is more reliably reduced.

(Item 12)

The first correction coefficient and the second correction coefficient may be determined according to the N corresponding to the number of the exposure regions. In this manner, by determining the exposure condition according to the number (N) of divisions of the exposure region, disparity in the density is more reliably reduced.

(Item 13)

The operation unit 1304 is an example of an input device that accepts input of the first correction coefficient and the second correction coefficient. In this manner, the user may input and adjust the correction coefficient. The user input may be a numerical value or may be a command instructing to increase or decrease the numerical value.

(Item 14)

The memory 1302 may store a thickness of a photosensitive layer of N exposure regions of the surface of the photosensitive body or thickness information relating to a reduction amount of the thickness. The CPU 1301 is an example of a control circuit that determines the exposure condition on the basis of the thickness information for each one of the N exposure regions. Also, the CPU 1301 may control the exposure light source to expose each one of the N exposure regions to light according to the exposure condition.

According to the first to fourth embodiment, the cumulative number of images per exposure region is stored in the memory 1302. The cumulative number of images may be thickness information relating to the thickness or the thickness reduction amount. For example, the thickness or the thickness reduction amount may be calculated from the cumulative number of images, and the thickness or the thickness reduction amount per exposure region may be stored in the memory 1302. In this case, in the formula EQ.1, the thickness or the thickness reduction amount is substituted into the equation (correction formula) as the input. In this manner, by determining the exposure condition individually for each one of the N exposure regions, disparity in the density may be reduced.

(Item 15)

The CPU 1301 and the selection unit 1319 are an example of a control circuit that determines the content of image correction on the basis of the cumulative image formation amount for each one of the N exposure regions. The CPU 1301 and the image processing unit 1312 may function as an image correction unit that corrects image data corresponding to the N exposure regions according to the content of the image correction determined for each one of the N exposure regions. In this manner, by selecting the image processing condition individually per exposure region on the basis of the cumulative number of pixels, disparity in the density may be reduced.

(Item 16)

The content of the image correction include dither processing. Here, dither processing is image processing relating to image density. Thus, by selecting the dither processing individually per exposure region on the basis of the cumulative number of pixels, disparity in the density may be reduced.

(Item 17)

The post-processing apparatus 130 is an example of a booklet manufacturing apparatus that forms a sheet bundle including layers of sheets discharged from the image forming apparatus, heats the adhesive toner image of the sheet bundle to re-melt the adhesive toner image, and presses the sheet bundle to bond together the sheet bundle and manufacture a booklet. As illustrated in FIG. 2A, the adhesive toner image forming position tends to be a specific position. Thus, a disparity in density tends to become apparent. According to the first to fourth embodiment, with the image forming system 1, disparity in density is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-110258, filed Jul. 4, 2023 which is hereby incorporated by reference herein in its entirety.

What is claimed is:

1. An image forming apparatus comprising:

a rotationally driven photosensitive body;

a charging device that charges a surface of the photosensitive body;

an exposure light source that forms an electrostatic latent image by exposing the surface of the photosensitive body to light;

a developing device that forms a toner image by developing the electrostatic latent image using toner;

a transfer member that transfers the toner image to a sheet;

a first memory that stores a cumulative image formation amount for each one of N exposure regions of the surface of the photosensitive body; and a control circuit that controls the exposure light source so that an exposure condition is determined on a basis of the cumulative image formation amount for each one of the N exposure regions and each one of the N exposure regions is exposed with light according to the exposure condition.

2. The image forming apparatus according to claim 1, wherein the control circuit determines the exposure condition for each one of the N exposure regions so that an exposure amount increases as the cumulative image formation amount increases.

3. The image forming apparatus according to claim 1, wherein the N exposure regions are arranged in a first direction parallel with a rotary shaft of the photosensitive body.

4. The image forming apparatus according to claim 1, wherein the N exposure regions are arranged in a second direction orthogonal to a first direction parallel with a rotary shaft of the photosensitive body.

5. The image forming apparatus according to claim 1, wherein the N exposure regions are arranged in a matrix pattern on the surface of the photosensitive body.

6. The image forming apparatus according to claim 1, further comprising a sensor that detects an environment condition of an environment where the image forming apparatus is installed, wherein the control circuit determines the exposure condition for each one of the N exposure regions on a basis of the cumulative image formation amount and the environment condition detected by the sensor.

7. The image forming apparatus according to claim 6, further comprising a second memory that stores a plurality of correction formulas associated in a one-to-one relationship with a plurality of different environment conditions, wherein the control circuit determines the exposure condition for each one of the N exposure regions by selecting, from among the plurality of correction formulas, a correction formula corresponding to the environment condition detected by the sensor and using the selected correction formula.

8. The image forming apparatus according to claim 6, wherein the environment condition includes at least one of temperature and humidity.

9. The image forming apparatus according to claim 1, wherein the control circuit multiplies the cumulative image formation amount for each one of the N exposure regions and a first correction coefficient to obtain a product, adds a second correction coefficient to the product, and determines an exposure amount for the exposure condition.

10. The image forming apparatus according to claim 9, wherein the first correction coefficient and the second correction coefficient are determined according to a type of the toner.

11. The image forming apparatus according to claim 9, wherein the first correction coefficient and the second correction coefficient are determined according to a type of the photosensitive body.

12. The image forming apparatus according to claim 9, wherein the first correction coefficient and the second correction coefficient are determined according to the N corresponding to a number of the exposure regions.

13. The image forming apparatus according to claim 9, further comprising an input device that accepts input of the first correction coefficient and the second correction coefficient.

14. An image forming apparatus comprising:

a rotationally driven photosensitive body;

a charging device that charges a surface of the photosensitive body;

an exposure light source that forms an electrostatic latent image by exposing the surface of the photosensitive body to light;

a developing device that forms a toner image by developing the electrostatic latent image using toner;

a transfer member that transfers the toner image to a sheet;

a memory that stores a thickness of a photosensitive layer of N exposure regions of the surface of the photosensitive body or thickness information relating to a reduction amount of the thickness; and a control circuit that controls the exposure light source so that an exposure condition is determined on a basis of the thickness information for each one of the N exposure regions and each one of the N exposure regions is exposed with light according to the exposure condition.

15. An image forming apparatus comprising:

a rotationally driven photosensitive body;

a charging device that charges a surface of the photosensitive body;

an exposure light source that forms an electrostatic latent image by exposing the surface of the photosensitive body to light;

a developing device that forms a toner image by developing the electrostatic latent image using toner;

a transfer member that transfers the toner image to a sheet;

a memory that stores a cumulative image formation amount for each one of N exposure regions of the surface of the photosensitive body; and a control circuit that determines content of image correction on a basis of the cumulative image formation amount for each one of the N exposure regions, wherein the control circuit corrects image data corresponding to the N exposure regions according to the content of the image correction determined for each one of the N exposure regions.

16. The image forming apparatus according to claim 15, wherein the content of the image correction includes dither processing.

17. An image forming system comprising:

an image forming apparatus that forms a toner image as a user image prepared by a user and an adhesive toner image as an adhesive; and a booklet manufacturing apparatus that forms a sheet bundle including layers of sheets discharged from the image forming apparatus, heats the adhesive toner image of the sheet bundle to re-melt the adhesive toner image, and presses the sheet bundle to bond together the sheet bundle and manufacture a booklet, wherein the image forming apparatus comprises:

a rotationally driven photosensitive body;

a charging device that charges a surface of the photosensitive body;

an exposure light source that forms an electrostatic latent image by exposing the surface of the photosensitive body to light;

a developing device that forms a toner image by developing the electrostatic latent image using toner;

a transfer member that transfers the toner image to a sheet;

a memory that stores a cumulative image formation amount for each one of N exposure regions of the surface of the photosensitive body; and a control circuit that controls the exposure light source so that an exposure condition is determined on a basis of the cumulative image formation amount for each one of the N exposure regions and each one of the N exposure regions is exposed with light according to the exposure condition.

* * * * *